US012694212B2

(12) United States Patent
Roy et al.

(10) Patent No.: US 12,694,212 B2
(45) Date of Patent: Jul. 28, 2026

(54) EFFICIENT MULTI-RELATION PREDICTION WITH IMPROVED CONTEXT COMPUTATION

(71) Applicant: Oracle International Corporation, Redwood Shores, CA (US)

(72) Inventors: Suman Roy, Bangalore (IN); Srijon Sarkar, Bangalore (IN); Fahimeh Sadat Saleh, Melbourne (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 126 days.

(21) Appl. No.: 18/656,831

(22) Filed: May 7, 2024

(65) Prior Publication Data

US 2025/0348673 A1      Nov. 13, 2025

(51) Int. Cl.
*G06F 40/284* (2020.01)

(52) U.S. Cl.
CPC .................................. *G06F 40/284* (2020.01)

(58) Field of Classification Search
CPC .................................................... G06F 40/284
USPC ......................... 704/231–232, 239–240, 251
See application file for complete search history.

(56) References Cited

FOREIGN PATENT DOCUMENTS

| CN | 112270196 B | 4/2022 | |
| CN | 115935989 A | 4/2023 | |
| CN | 116796744 A | 9/2023 | |
| CN | 117592477 A | * 2/2024 ........... | G06F 40/295 |
| WO | 2024044031 A1 | 2/2024 | |

OTHER PUBLICATIONS

International Application No. PCT/US2025/026260, International Search Report and Written Opinion, Mailed On Aug. 13, 2025, 9 pages.

(Continued)

*Primary Examiner* — George C Monikang
(74) *Attorney, Agent, or Firm* — Kilpatrick Townsend & Stockton LLP

(57) ABSTRACT

Method includes: accessing text, where spans are identified within the text and include one or more pairs of target spans and one or more mid-context spans; generating embedding representations of tokens associated with each target span, tokens associated with the entity types of each target span, and tokens associated with each mid-context span; generating, for each target span, entity-focused span embedding representation based on embedding representations of tokens associated with each target span and embedding representations of tokens associated with entity type of target span; generating, for each mid-context span, mid-context embedding representation based on the embedding representations of tokens associated with each mid-context span; and generating probability distribution of each relation of set of relations based on entity-focused span embedding representations of subject span and object span that are included in each target pair and mid-context embedding representation for mid-context span appearing between subject span and object span.

20 Claims, 15 Drawing Sheets

(56)　　　　　References Cited

OTHER PUBLICATIONS

Bahdanau et al., "Neural Machine Translation by Jointly Learning to Align and Translate", International Conference on Learning Representations, Available Online at: https://arxiv.org/pdf/1409.0473.pdf, May 19, 2016, pp. 1-15.

Krebs et al., "SemEval-2018 Task 10: Capturing Discriminative Attributes", Proceedings of the 12th International Workshop on Semantic Evaluation, Available online at: https://aclanthology.org/S18-1117/, Jun. 5-6, 2018, pp. 732-740.

Lee et al., "Learning Recurrent Span Representations for Extractive Question Answering", Available Online at: https://arxiv.org/pdf/1611.01436.pdf, Nov. 4, 2016, pp. 1-9.

Shaw et al., "Self-Attention with Relative Position Representations", Proceedings of NAACL-HLT, Available Online at: https://aclanthology.org/N18-2074.pdf, Jun. 1-6, 2018, pp. 464-468.

Wang et al., "Extracting Multiple-Relations in One-Pass with Pre-Trained Transformers", Proceedings of the 57th Annual Meeting of the Association for Computational Linguistics, Available Online at: https://aclanthology.org/P19-1132.pdf, Jul. 28-Aug. 2, 2019, pp. 1371-1377.

Wei et al., "A Novel Cascade Binary Tagging Framework for Relational Triple Extraction", Proceedings of the 58th Annual Meeting of the Association for Computational Linguistics, Available online at: https://aclanthology.org/2020.acl-main.136.pdf, Jul. 5-10, 2020, pp. 1476-1488.

Wu et al., "Enriching Pre-Trained Language Model with Entity Information for Relation Classification", Proceedings of the 28th ACM International Conference on Information and Knowledge Management, Available Online at: https://dl.acm.org/doi/pdf/10.1145/3357384.3358119, Nov. 3-7, 2019, pp. 2361-2364.

Zhong et al., "A Frustratingly Easy Approach for Entity and Relation Extraction", Proceedings of the 2021 Conference of the North American Chapter of the Association for Computational Linguistics: Human Language Technologies, Available Online at: https://aclanthology.org/2021.naacl-main.5.pdf, Jun. 6-11, 2021, pp. 50-61.

* cited by examiner

600

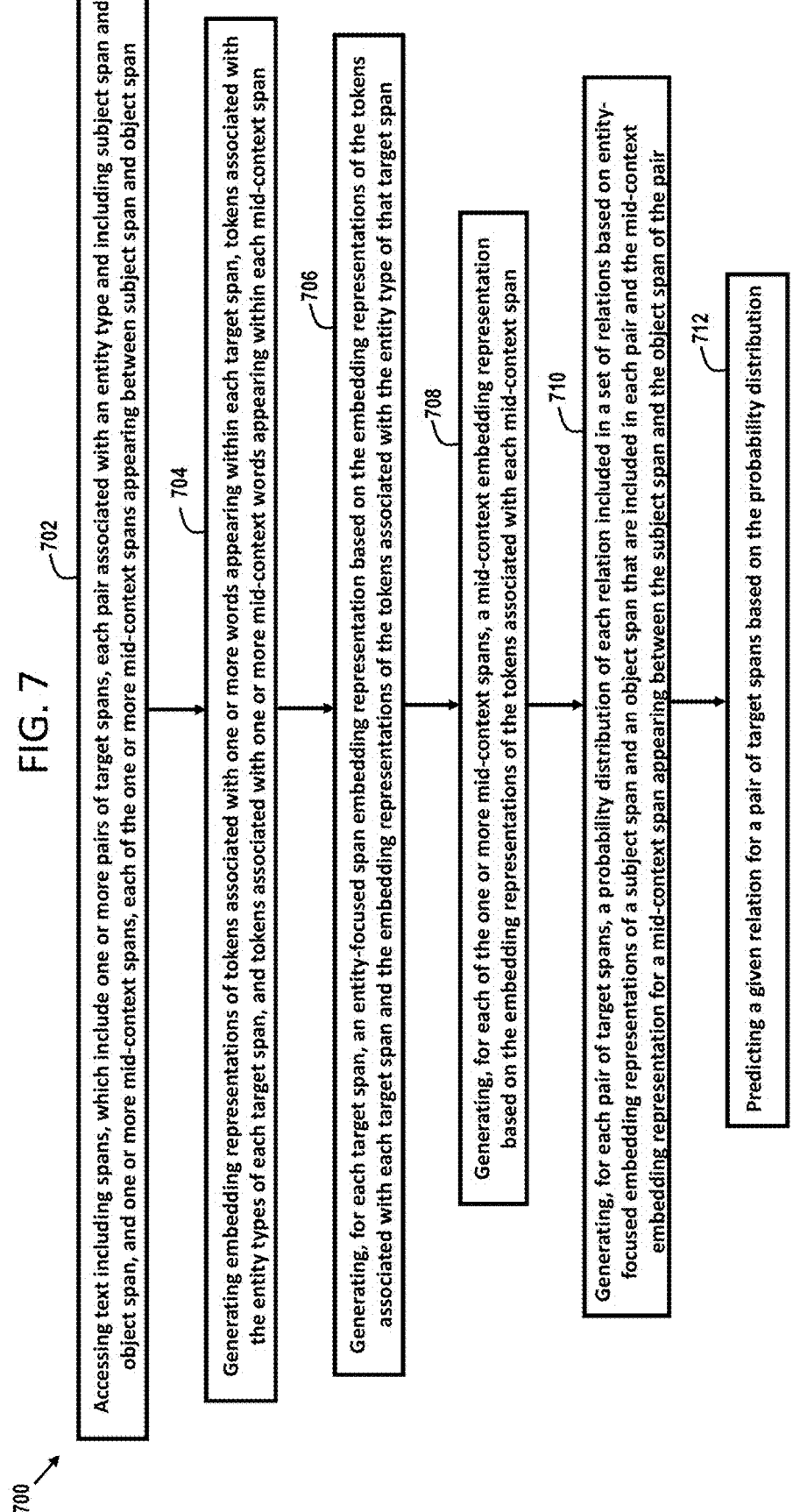

702 Accessing text including spans, which include one or more pairs of target spans, each pair associated with an entity type and including subject span and object span, and one or more mid-context spans, each of the one or more mid-context spans appearing between subject span and object span 704 Generating embedding representations of tokens associated with one or more words appearing within each target span, tokens associated with the entity types of each target span, and tokens associated with one or more mid-context words appearing within each mid-context span 706 Generating, for each target span, an entity-focused span embedding representation based on the embedding representations of the tokens associated with each target span and the embedding representations of the tokens associated with the entity type of that target span 708 Generating, for each of the one or more mid-context spans, a mid-context embedding representation based on the embedding representations of the tokens associated with each mid-context span 710 Generating, for each pair of target spans, a probability distribution of each relation included in a set of relations based on entity-focused embedding representations of a subject span and an object span that are included in each pair and the mid-context embedding representation for a mid-context span appearing between the subject span and the object span of the pair 712 Predicting a given relation for a pair of target spans based on the probability distribution

FIG. 13

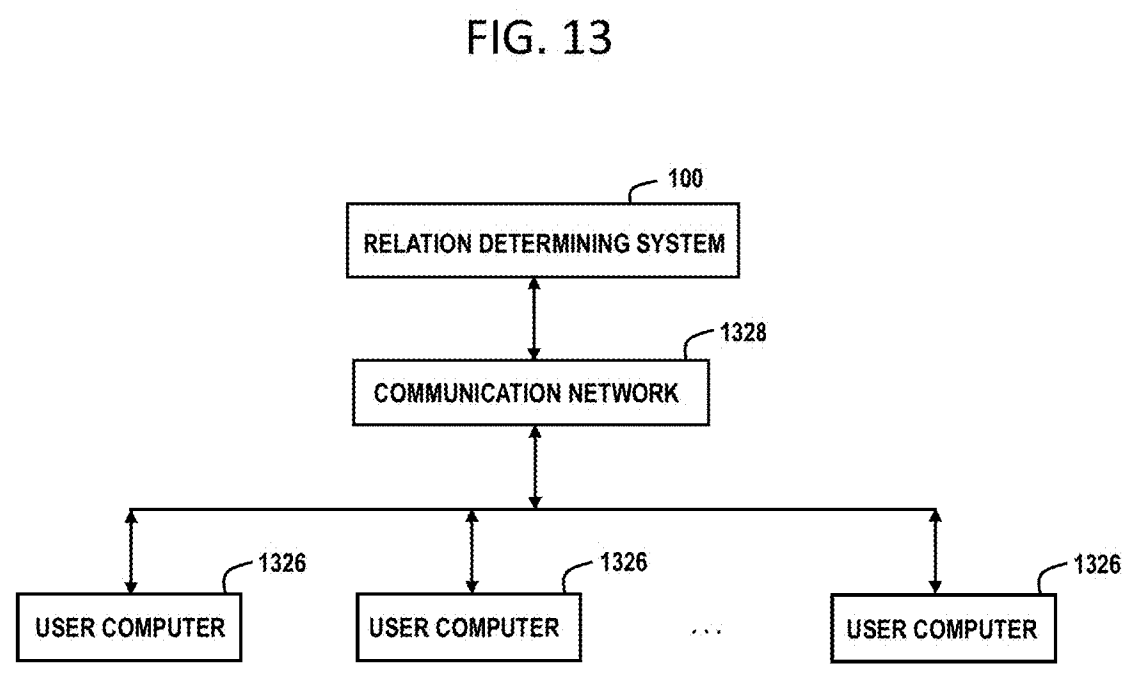

RELATION DETERMINING SYSTEM — 100

COMMUNICATION NETWORK — 1328

USER COMPUTER — 1326

USER COMPUTER — 1326

USER COMPUTER — 1326

EFFICIENT MULTI-RELATION PREDICTION WITH IMPROVED CONTEXT COMPUTATION

FIELD

The present disclosure relates generally to artificial intelligence (AI) techniques, and more particularly, to techniques for relation extraction with improved context computation.

BACKGROUND

Natural Language Processing (NLP) is a subfield of AI that focuses on the interaction between computers and humans using natural language. The goal of NLP is to enable machines to understand, interpret, and/or generate human language in a way that is meaningful and contextually relevant. NLP can be utilized in many fields including, without limitation, medical research, clinical health practice, search engines, business intelligence, and digital or virtual assistants. For example, in clinical health practice, NLP can be used to summarize large volumes of text, perform automatic doctor-patient speech recognition, and/or identify personally identifiable information (PII)/protected health information (PHI). In order to accomplish this goal independent of the field of use, NLP involves a combination of linguistic and computational methods or tasks to enable computers to understand, interpret, and/or generate human language. These methods or tasks collectively enable computers to process and understand natural language, making it possible to perform various jobs such as text summarization, machine translation, question answering, etc.

Named entity recognition (NER) and relation extraction (RE) are specific methods or tasks within NLP. NER is a task in which the goal is to identify and classify entities within a text. Entities are typically real-world objects such as names of people, organizations, locations, dates, numerical values, etc. For example, in the sentence "Oracle Corporation is headquartered in Austin, Texas," NER can identify "Oracle Corporation" as an organization and "Austin, Texas" as a location. RE involves identifying and classifying relations between entities mentioned in a text. Here, a relation between entity types organization and location may be "headquarteredAT." Using RE, this relation can be encoded as: headquarteredAT (Oracle Corporation, Austin).

SUMMARY

Techniques disclosed herein relate generally to AI techniques, and more particularly, to techniques for relation extraction with improved context computation.

In various embodiments, a computer-implemented method is provided that includes accessing text including a sequence of words, where a plurality of spans is identified within the text, each span of the plurality spans includes one or more words from the sequence of words, and the plurality of spans includes one or more pairs of target spans, each target pair of the one or more pairs of target spans being associated with an entity type and including a subject span and an object span, and one or more mid-context spans, each mid-context span of the one or more mid-context spans appearing between a subject span and an object span that are included in each target pair; generating, by a pre-trained machine learning (ML) model, embedding representations of tokens associated with one or more words appearing within each target span, tokens associated with the entity types of each target span, and tokens associated with one or more mid-context words appearing within each mid-context span; generating, by the pre-trained ML model for each target span, an entity-focused span embedding representation based on the embedding representations of the tokens associated with each target span and the embedding representations of the tokens associated with the entity type of that target span; generating, by the pre-trained ML model for each mid-context span, a mid-context embedding representation based on the embedding representations of the tokens associated with each mid-context span; generating, by the pre-trained ML model for each target pair, a probability distribution of each relation included in a set of relations based on entity-focused span embedding representations of a subject span and an object span that are included in each target pair and the mid-context embedding representation for a mid-context span appearing between the subject span and the object span of the target pair, the set of relations including a null relation; and predicting, by the pre-trained ML model, a given relation for a pair of target spans based on the probability distribution.

In some embodiments, the entity-focused span embedding representation is generated by integrating information specific to the entity type with the embedding representations of the tokens associated with each target span using entity independent span token embedding, span-aligned entity embedding, and span-independent entity representation.

In some embodiments, the computer-implemented method further includes applying, by a fully connected layer of the pre-trained ML model, activation functions on the entity-focused span embedding representations of the subject span and the object span and the mid-context embedding representation of the mid-context span appearing between the subject span and the object span for each target pair to obtain activated entity-focused span embedding representations of the subject span and the object span and activated mid-context embedding representation associated with for each target pair.

In some embodiments, the computer-implemented method further includes, for each target pair, generating, by the fully connected layer, a concatenation of the activated entity-focused span embedding representations of the subject span and the object span and the activated mid-context embedding representation associated with each target pair.

In some embodiments, the probability distribution of each relation for each target pair is generated based on the concatenation.

In some embodiments, the generating of the probability distribution of each relation for each target pair takes into consideration the information specific to the entity type integrated into the activated entity-focused span embedding representations of the subject span and the object span that are included in each target pair.

In some embodiments, the entity independent span token embedding maintains the embedding representations of the tokens associated with the one or more words within the target span, the span-aligned entity embedding includes a fixed-length representation of an entity type based on soft alignment with the tokens of the target span, and span-independent entity representation includes a representation of an entity type that does not depend on the tokens of the target span.

In various embodiments, a computer system is provided that includes one or more processors and one or more computer-readable media storing instructions that, when executed by the one or more processors, cause the one or more processors to perform part or all of the operations and/or methods disclosed herein.

In various embodiments, one or more non-transitory computer-readable media are provided, the one or more non-transitory computer-readable media storing instructions that, when executed by one or more processors of a computer system, cause the one or more processors to perform part or all of the operations and/or methods disclosed herein.

The techniques described herein may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 7 is a simplified block diagram of a processing performed by the relation determining system in accordance with various embodiments.

FIG. 13 is a simplified block diagram of a relation determining system in a distributed computing environment according to various embodiments.

DETAILED DESCRIPTION

Figure 1:
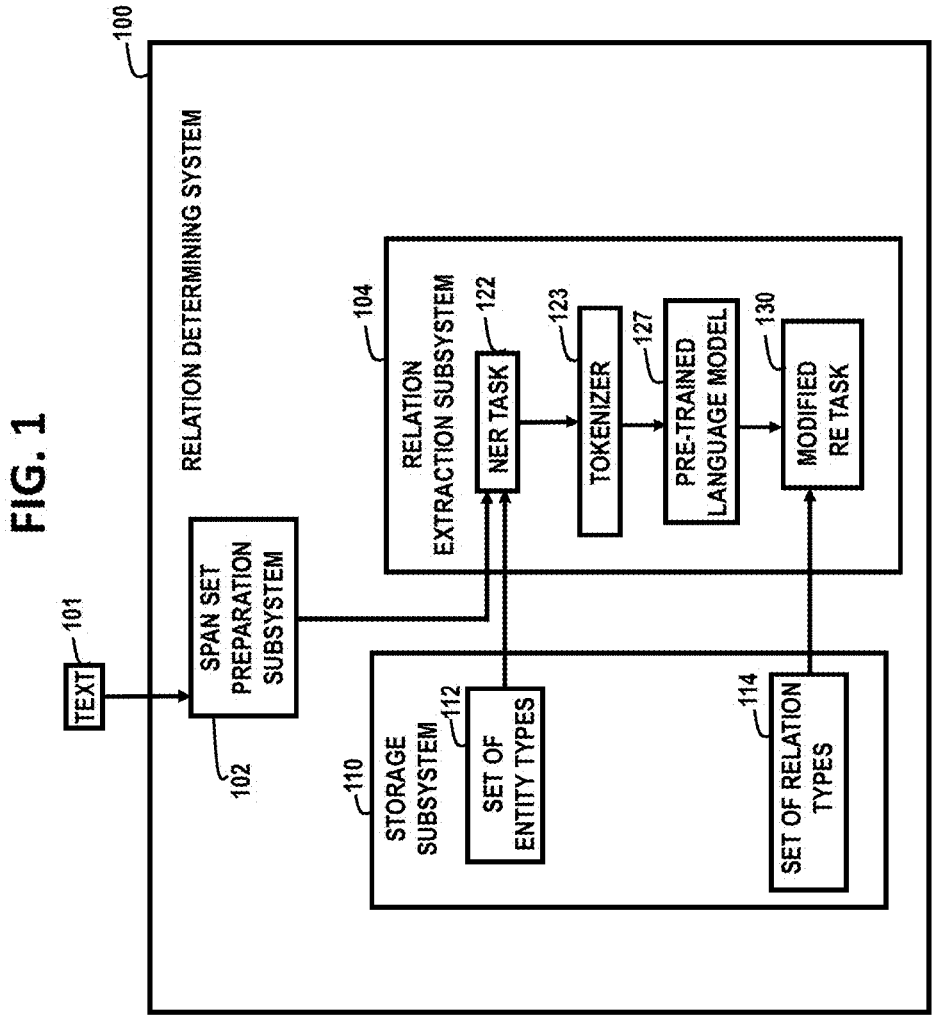
FIG. 1 is a simplified block diagram of a relation determining system according to various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

I. Introduction

Artificial intelligence techniques have many natural language processing applications. In a medical setting, AI can be broadly applied to drug discovery, and can be used to diagnose disease, to predict disease, to provide a disease prognosis, to identify potential drug interactions, for medical imaging analysis, and for other purposes. AI techniques such as NER techniques can be used to identify and classify entities in medical and other text. Additional NLP techniques such as RE can be used in conjunction with NER to enhance the natural language processing of textual information.

NER (also known as entity identification (EI) and entity extraction) is the task to locate and classify atomic elements in the text into predetermined categories or entity types such as the names of persons, organizations, locations, expressions of times, quantities, monetary values, percentages, etc. For example, in the text "John sold 5 companies in 2002," the trained ML model can recognize entity John of an entity type "PERSON," entity "5 companies" of an entity type "QUANTITY," and entity "2002" of an entity type "DATE," where "PERSON," "QUANTITY," and "DATE" are included in a set of predetermined entity types. Additional words ("sold" and "in") may be identified as non-entities or null entities.

Accordingly, NER task of the trained ML model has a goal of finding entities (or names) in the text and classifying them by entity type. As mentioned above, the entity types included in a set of the predetermined entity types may include person, quantity, and date. However, this is not intended to be limiting. For example, the set of the predetermined entity types may further include organization, location, etc. In the medical domain, the set of the predetermined entity types may include person, medication, disease, side effect, anatomical region, etc.

Relation prediction or relation extraction task connects entity types by a relation included in a set of predetermined relations. For example, given the text, "American Airlines, a unit of AMR, immediately matched the price of United Airlines, spokesman Tim Wagner said. United, a unit of UAL, said that the price increase took effect Thursday," NER task can identify entities American Airlines, AMR, United Airlines, Tim Wagner, and UAL. Then, the relation extraction task can connect entities (in the form of spans) by a relation. For example, the relation extraction task can connect American Airlines and AMR by a relation "subsidiary," American Airlines being a subsidiary of AMR. Likewise, the relation extraction task can connect Tim Wagner and American Airlines by a relation "employee" (Tim Wagner being an employee of American Airlines) and United Airlines and UAL by a relation "subsidiary" (United Airlines being a subsidiary of UAL).

As used herein, the span is a set of words. The span can include one word or few consecutive words from a sequence of words in the input text. The span may be an entity span that can be associated with an entity type. Alternately, the span may be a non-entity span, i.e., a null entity.

As mentioned above, the relation (e.g., a relation type) included in a set of the predetermined relation types may include subsidiary and employee. However, this is not intended to be limiting and the set of the predetermined relations may include relations determined for a certain domain. For example, in the medical domain, the set of the predetermined relations may include "medication-takenby," "disease-sufferedby," "dosage-of-medicine," etc.

The relation extraction methods can use a pre-trained language model. Initially, tokenization on the text is performed, after which possible spans using the token representations are generated.

After the tokenization, the token representations (capturing spans of interest) are fed to a pre-trained language model, e.g., bidirectional encoder representations from transformers (BERT). The BERT-based models produce embeddings in some fixed-dimensional latent space. Different relation extraction models process the span embeddings in different ways and pass the processed embeddings to a fully connected layer, the output of which is passed to a softmax module to compute the probability distribution of a golden relation with respect to a pair of spans in question.

For training, an appropriate log-likelihood loss function is formulated from the probability distribution of the relation, which is optimized using a batch procedure. This leads to learning the parameters of the networks (fully connected layer and BERT-like encoder) in the model. Few dropouts may be added suitably. During inference, the probability distribution of a relation with respect to every candidate pair of spans in the context of the associated sentence can be computed. A relation symbol can be assigned to a pair of spans corresponding to the pair of mapped entities for which the maximum probability is obtained (among all relation candidates). A special relation called 'No-Relation' may be used in the computation, which denotes a possible absence of relation between a pair of spans.

However, the current techniques are deficient in that no entity type information or contextual information corresponding to the mid-words appearing between entities of interest is provided at the output of the pre-trained language model. This may lead to sub-optimal prediction of the relation type.

Accordingly, different approaches are needed to address these challenges and others.

In various embodiments, a computer-implemented method is provided that includes: accessing text including a sequence of words, where a plurality of spans is identified within the text, each span of the plurality spans includes one or more words from the sequence of words, and the plurality of spans includes one or more pairs of target spans, each pair of the one or more pairs of target spans being associated with an entity type, each pair including a subject span and an object span, and one or more mid-context spans, each of the one or more mid-context spans appearing between a subject span and an object span that are included in each target pair of the one or more pairs of target spans; generating, by a pre-trained machine learning (ML) model, embedding representations of tokens associated with one or more words appearing within each of the target spans, tokens associated with the entity types of each of the target spans, and tokens associated with one or more mid-context words appearing within each of the one or more mid-context spans; generating, by the pre-trained ML model for each of the target spans, an entity-focused span embedding representation based on the embedding representations of the tokens associated with each target span and the embedding representations of the tokens associated with the entity type of that target span; generating, by the pre-trained ML model for each of the one or more mid-context spans, a mid-context embedding representation based on the embedding representations of the tokens associated with each mid-context span; generating, by the pre-trained ML model for each pair of the one or more pairs of target spans, a probability distribution of each relation included in a set of relations based on entity-focused span embedding representations of a subject span and an object span that are included in each target pair and the mid-context embedding representation for a mid-context span appearing between the subject span and the object span of the pair, the set of relations including a null relation; and predicting, by the pre-trained ML model, a given relation for a pair of target spans based on the probability distribution.

In the disclosed techniques, unlike in the related art techniques, the information specific to the entity type is provided at the output of the pre-trained language model (e.g., BERT) and can be passed to the fully connected and softmax layers of the relation extraction task.

In the disclosed techniques, the mid-context information is calculated according to a specific improved technique; thereby providing improved contextual information of the mid-context to the fully connected and softmax layers of the relation extraction task.

In comparison to the current systems and methods, in the disclosed techniques, richer context-informed embedding representation can be provided to a fully connected layer that leads to substantial improvement in accuracy of probability distribution of relations, which can be integrated within a framework for predicting multiple relations in one pass.

Additionally, since the disclosed techniques are capable of predicting relations for all pairs of target spans in a chunk of input text in one pass, the latency time can be substantially reduced and the computing resources preserved.

II. Relation Determining System

FIG. 1 is a simplified block diagram of a relation determining system 100 according to various embodiments. The relation determining system 100 may be implemented using one or more computer systems, each computer system having one or more processors. The relation determining system 100 may include multiple components and subsystems communicatively coupled to each other via one or more communication mechanisms. For example, in the embodiment depicted in FIG. 1, the relation determining system 100 includes a span set preparation subsystem 102 and a relation extraction subsystem 104.

These subsystems may be implemented as one or more computer systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The relation determining system 100 depicted in FIG. 1 is merely an example and is not intended to unduly limit the scope of embodiments. Many variations, alternatives, and modifications are possible. For example, in some implementations, the relation determining system 100 may have more or fewer subsystems or components than those shown in FIG. 1, may combine two or more subsystems, or may have a different configuration or arrangement of subsystems. The relation determining system 100 and subsystems depicted in FIG. 1 may be implemented using one or more computer systems, such as the computer system depicted in FIG. 12.

As shown in FIG. 1, the relation determining system 100 also includes a storage subsystem 110 that may store the various data constructs and programs used by the relation determining system 100. For example, the storage subsystem 110 may store a set of entity types 112 and a set of relation types 114.

The relation determining system 100 is configured to receive a sequence of words 101, e.g., a chunk of text, and output pairs of target spans with predicted relation types between two target spans included in each pair.

Herein, the span that corresponds to the entity type (e.g., that is included in the set of entity types 112) is referred to as a target span. The target span may share a relation with another span (e.g., another target span). Two target spans that can share a relation are referred to as a pair of target spans or a target pair. Each pair of target spans includes a subject span and an object span, i.e., the target spans of each pair are linked by a subject-object relationship, where the subject span and the object span of the pair are associated with respective entity types that can be different from each other. The target span, which is a subject span in one pair, can be considered as an object span in another target pair in the batch processing described below.

Further, the spans between the target spans of the pair of target spans are referred to as mid-context spans. The mid-context span includes one or more mid-context words that appear between the subject span and the object span that included in the pair of target spans.

With continuing reference to FIG. 1, the span set preparation subsystem 102 receives, as an input, text, e.g., a document, a portion of text, a chunk of text, etc. The span set preparation subsystem 102 may identify spans in the text.

In an embodiment, the span set preparation subsystem 102 may receive a chunk of text including an input sequence of words $D=\{w_1, w_2, \ldots, w_n\}$. The span set preparation subsystem 102 can construct a set of spans $S=\{s_1, s_2, \ldots, s_N\}$ using the input sequence of words D. The set of spans includes spans (up to a reasonable length) from the text of the document. For example, the set of spans may include all spans within a sentence, within a chunk of text, within a document, etc. The length of each span may be from one to five consecutive words. However, this is not intended to be limiting. In some implementations, the length of the span may be greater than five words.

Given an example input text, "The patient is advised Telmisartan for hypertension. His BP reading is moderate.", the span set preparation subsystem 102 can construct the set of spans S. Examples of the spans generated for the above sentences may include:

"The", "The patient", "The patient is", . . .
"Patient", "Patient" is", . . .
"Advised", "Advised Telmisartan" . . .
"For", "for hypertension", . . .
"His", "his BP", "his BP reading"
"Is", "is moderate"
"moderate"
Etc.

The span set preparation subsystem 102 may provide, as an input, the set of spans S to a named entity recognition (NER) task 122. Although in FIG. 1 the NER task 122 is shown as a component of the relation extraction subsystem 104, this is not intended to be limiting. In some implementations, the NER task 122 may be a component separate from the relation extraction subsystem 104.

As mentioned above, the storage subsystem 110 may store the set of entity types 112. For example, the set of entity types 112 includes a set E of pre-defined entity types or classes, e.g., person, medication, disease, etc. The set of entity types 112 can be provided as an input to the NER task 122.

The NER task 122 can, for every span $s_i \in S$, predict an entity type, $y_e(s_i) \in E$, (where E is the pre-defined set of entity types, which includes a null entity type $\epsilon$) or $y_e(s_i)=\epsilon$, (the latter represents the fact that $s_i$ does not represent an entity, e.g., it is a non-entity such as a word "is"). As mentioned above, in an embodiment, each entity within the text, where a corresponding entity type within the set of entity types 112 is predicted, corresponds to a target span, e.g., a span that may share a relation with another span (e.g., another target span).

The NER task 122 can then output augmented entities $Y_e=\{(s_i, e):s_i \in S, e \in E\}$. For example, the NER task 122 can output a labeled text that corresponds to the input text, in which the markers are inserted to indicate entities and their types. Herein, the augmented entities output by the NER task 122 may be referred to as labeled entities. In the labeled text, the augmented entities have corresponding markers and the mid-context spans are disposed between the labeled entities.

For example, the input text D is "The patient is advised Telmisartan for hypertension. His BP reading is moderate." The NER task 122 can map the entities of the input text D to the entity types of the set of entity types 112 (or null entities) as follows:

The Patient→PERSON
Advised→Null (E)
Telmisartan→MED
Hypertension→DISEASE
BP Reading→CLINEXAM
Moderate→SEVERITY DEGREE

. . .

As shown above, "the patient" is mapped to person, "telmisartan" to medication, "hypertension" to disease, "BP reading" to a clinical exam, "moderate" to a severity degree, and "advised" is mapped to a null entity that is denoted as ($\epsilon$), (other spans in the text are mapped to null entity).

Below is an example of target spans with mapped entity types:

$$Y_e = \{(\text{The Patient, PERSON}), (\textit{Telmisartan, MED}),$$
$$(\text{Hypertension, DISEASE}), (\textit{BP}\,\text{Reading}, \textit{CLINEXAM})\}$$

Accordingly, the output of the NER task 122 can be the labeled text where the entity values are augmented with the entity types. The mid-context spans are disposed between the augmented entities, e.g., the target spans.

The relation extraction subsystem 104 may further include a tokenizer 123. The tokenizer 123 may receive, as an input, the labeled text from the NER task 122. The tokenizer 123 may perform certain processing on the labeled text and output tokens, where each token corresponds to a word of each span, e.g., a target span or a mid-context span. The tokenizer 123 may also output tokens corresponding to the words included in the entity type descriptions.

The relation extraction subsystem 104 may further include a pre-trained language model 127. As an example, the pre-trained language model 127 may be a BERT model, e.g., a multi-layer bidirectional transformer encoder. In an embodiment, the BERT model may be Bio-BERT, Med-Bert, Clinical BERT, etc.

The pre-trained language model 127 may receive, as an input, the tokens output by the tokenizer 123. The pre-trained language model 127 may perform certain processing on the tokens and output token embeddings corresponding to the tokens.

The relation extraction subsystem 104 may further include a modified RE task 130. The architecture and detailed operations of the modified RE task 130 are described below with reference to FIG. 5A.

In an embodiment, the modified RE task 130 can receive, as an input, the token embeddings output by the pre-trained language model 127. The modified RE task 130 can also receive, as an input, the set of relation types 114 stored in the storage subsystem 110. For example, the set of relation types 114 includes a set R of predetermined relation types or classes.

The modified RE task 130 can, for every pair of target spans (e.g., labeled entities) identified in the text D (e.g., {[the patient, person]; [Telmisartan, med]}, predict a relation type included among the relation types included in the set of relation types 114 or predict no relation (e.g., null relation), based on the contextual information of the particular pairs of target spans and the contextual information of the mid-context spans that appear in the sequence of words between the particular pairs of target spans. For example, the contextual information of the particular pairs of target spans may be provided by the entity type information.

The processing of the modified RE task 130 may be described as follows:

For all pairs of target spans, e.g., labeled entities $(s_i, e_k) \in Y_e$ and $(s_j, e_l) \in Y_e$, appearing in input text D, predict a relation type $y_r(s_i, s_j) \in R$ in one pass, where R is a predefined set of relations which includes a null relation $\emptyset$ (that is, a relation type may be no relation—e.g., $y_r(s_i, s_j) = \emptyset$). The output for all labeled pairs within the chunk of text is given as a set of triplets:

$$Y_R^S = \{(s_i, s_j, r): s_i, s_j \in S, r \in R\},$$

which appear in the chunk of text.

Above, $Y_e$ represents the labeled entity spans (e.g., target spans), $(s_i, e_k)$ is a subject span (e.g., a first target span) of the pair of target spans, $(s_j, e_l)$ is an object span (e.g., a second target span) of the pair of target spans, $s_i$ is an entity value of the subject span, $e_k$ is an entity type of the subject span, $s_j$ is an entity value of the object span, $e_l$ is an entity type of the object span, $y_r$ represents a relation map on a pair of spans, r is a given relation type between the given pair of the subject span and the object span, R represents the set of relation types 114 that includes a null relation $\emptyset$, S represents a set of spans.

Accordingly, the modified RE task 130 can output a set of relations $$Y_R^S$$

for the target pairs of the chunk of text.

For example, based on the above example of the input text D, "The patient is advised Telmisartan for hypertension. His BP reading is moderate.", the output may be triples as follows:

$$Y_R = \{(\text{The patient}, \textit{Telmisartan}, \textit{Med} - \textit{takenBy}),$$

$$(\text{The patient, Hypertention, Disease} - \textit{SufferedBy}),$$

$$(\textit{BP} \text{ Reading, Moderate, Severity} - \textit{Clinexam})\}$$

In the above example, each triple has a subject entity $s_i$ and a corresponding subject entity type $e_k$, and an object entity $s_j$ and a corresponding subject entity type $e_l$, i.e., the target spans are linked by a subject-object relationship. For example, in the pair {The patient, Telmisartan}, the patient is a subject and Telmisartan is an object. Further, each triple includes a relation, e.g., med-takenby, disease-sufferedby, severity-clinexam.

III. Relation Extraction Techniques

Figure 2:
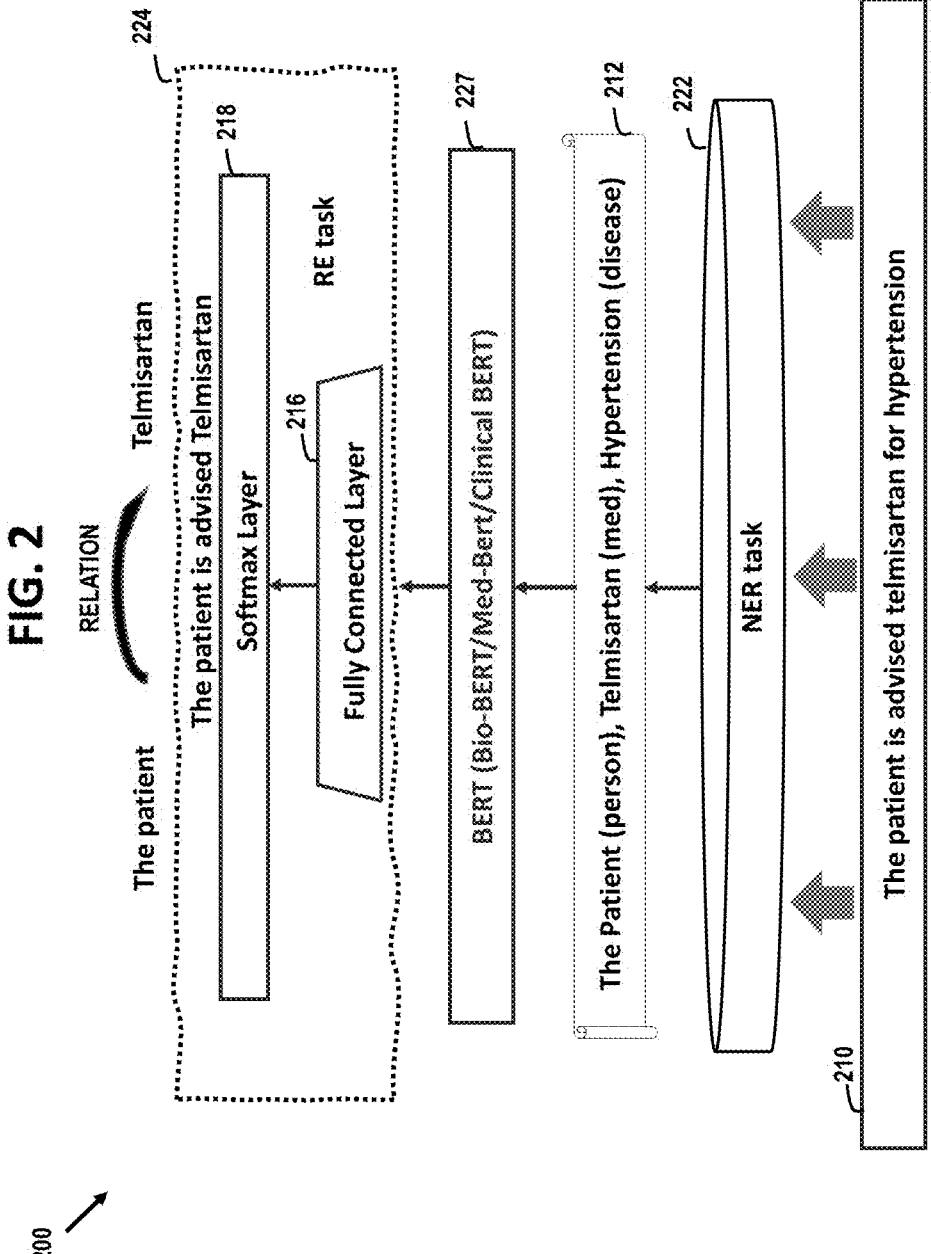
FIG. 2 is a simplified block diagram of a relation extraction technique.

FIG. 2 shows a simplified diagram of an example of a related art relation extraction system 200.

The relation extraction system 200 includes an NER task 222 and an RE task 224.

An input sentence 210 may be input to the NER task 222. The NER task 222 processes the sentence and outputs the labeled entities 212, e.g., where each entity (e.g., entity value) is augmented with a corresponding entity type. Each labeled entity, e.g., augmented entity, represents a target span, e.g., a span that may share a relation with another span.

The labeled entities 212 are tokenized and passed to a BERT model 227.

The output of the BERT model 227 is token embeddings associated with each labeled entity that are then passed to a fully connected layer 216. The fully connected layer 216 maps each of the token embeddings into a scalar value that is passed to a softmax layer 218. The softmax layer 218 may construct a softmax function using the scalar value(s). The softmax function provides the probability of a given relation between the given pair of target spans. If for a given pair of spans the probability of a particular relation type is higher than that for any other relation type of the set of relation types, then the particular relation type is assigned to be the predicted relation between the given pair of spans.

For example, the input sentence 210 is "The patient is advised Telmisartan for hypertension," and the pair of target spans is "the patient" and "telmisartan." This pair is passed through the BERT model 227 to get the token embeddings. The token embeddings are passed to the fully connected layer 216, to obtain a scalar value with respect to all possible relation types, e.g., for a set of predefined relation types. The softmax layer 218 may construct a softmax function using the scalar values and provide the softmax probability distribution that identifies the probability of the patient and telmisartan being connected by each of the relation types. For example, if the probability value for the relation type "med-takenby" is greater than the probability of other relation types in the set of predefined relation types (e.g., Disease-Sufferedby, Severity-Clinexam, etc.), then it can be decided that the patient and telmisartan are connected by the relation type "med-takenby."

A. Relation Extraction Using R-BERT

Figure 3:
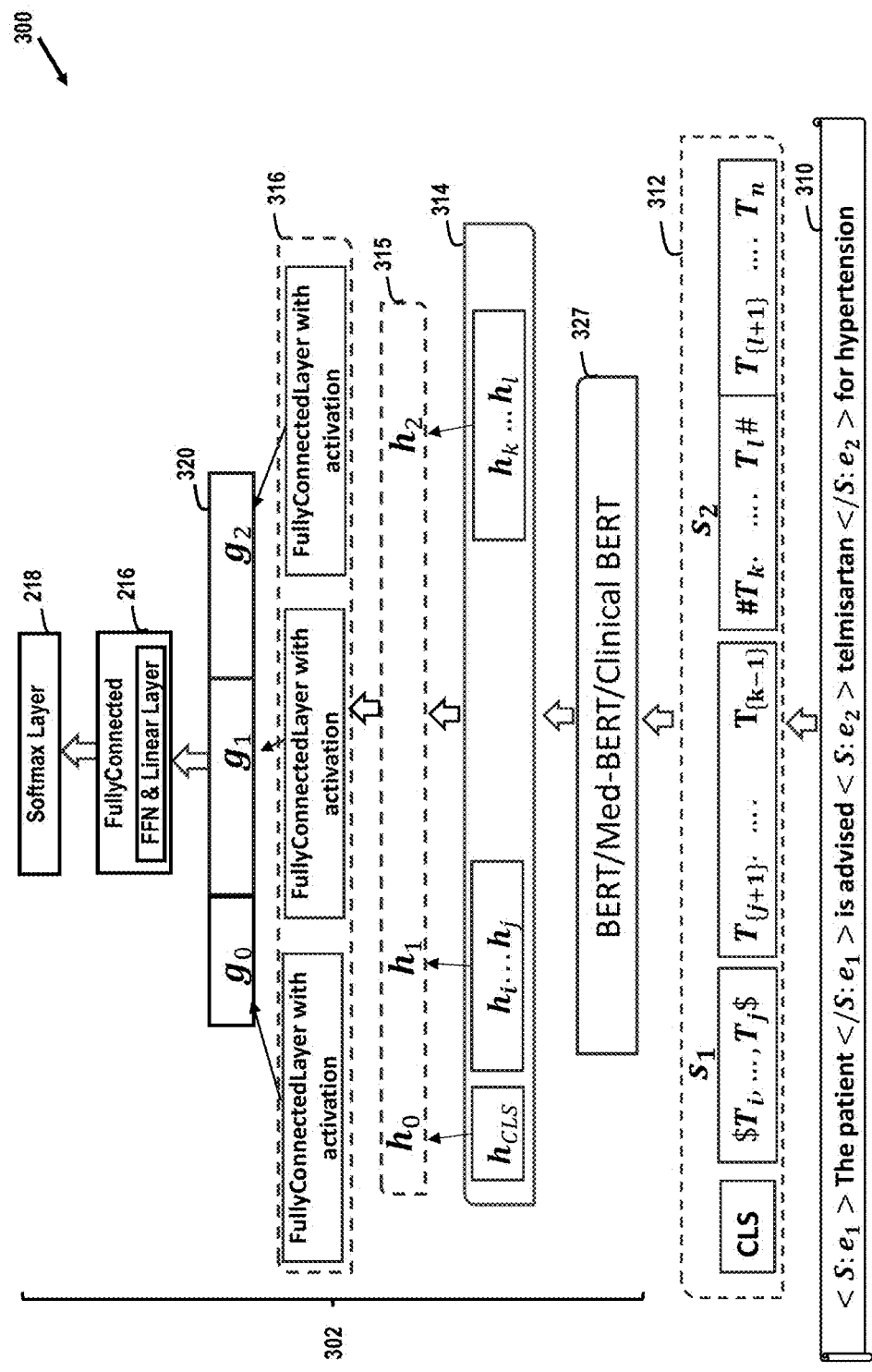
FIG. 3 is a simplified block diagram of a relation extraction system using R-BERT.

FIG. 3 shows a diagram of an example of a related art RE extraction system 300 including an R-BERT model 302.

In FIG. 3, a labeled sentence 310 indicates an output of the NER task. For example, the input sentence 210 shown in FIG. 2 has markers. For example, each pair of target spans includes a first target span (e.g., a subject span) and a second target span (e.g., an object span). The subject span of the labeled sentence 310, e.g., "The patient," is indicated by markers <S:e1> at the beginning of the subject span and markers </S:e1> at the end of the subject span. The object span of the labeled sentence 310, e.g., "telmisartan," is indicated by markers <S:e2> at the beginning of the object span and markers </S:e2> at the end of the object span. In-between the subject span and the object span, there is a mid-context span, "is advised."

The labeled sentence 310 is passed to a tokenizer 312. The tokenizer 312 is configured to convert the words of each of the spans into tokens. As shown, a string $ T_i, . . . T_j$ indicates the subject span s1, a string $T_{\{j+1\}} . . . T_{\{k-1\}}$ indicates the mid-context span, a string #T_k . . . T_j# indicates the object span s2, and a string $T_{\{l+1\}} . . . . T_n$ indicates the span corresponding to "for hypertension."

As shown in FIG. 3, a special token "$" is inserted at the beginning and end of the subject span (which correspond to markers <S:e1> and </S:e1> respectively) and a special token ' #' is inserted at the beginning and the end of the object span (which correspond to markers <S:e2> and </S:e2> respectively). These special tokens capture the embeddings of entity types $e_1$ and $e_2$ corresponding to spans s1 and s2. Also, a special token "CLS" indicates the beginning of the sentence.

The tokenized spans output by the tokenizer 312 may be passed to the BERT model 327. The BERT model 327 can, for a sentence s with two target spans having entities e1 and e2, capture the location information of two target spans, based on the special tokens inserted at the beginning and end of the first target span (e.g., the subject span) and the beginning and end of the second target span (e.g., the object span).

The output of the BERT model 327 is token embeddings 314 associated with the target spans of a token sequence received from the tokenizer 312. For example, the tokens appearing in the first target span $s_1$ are represented as $h_i, . . . , h_j$, where $h_i$ represents the first token and $h_j$ the last token in the first target span. Similarly, the tokens appearing in the second target span $s_2$ are represented as $h_k, . . . h_l$. The tokens appearing in the mid-context are represented as $h_{\{j+1\}} . . . h_{\{k-1\}}$.

The token embeddings of the first and second target spans (e.g., subject and object spans) are averaged over all the representative tokens in the spans to obtain vector representations 315 of the subject and object spans respectively:

$$h_1 = \frac{1}{j - i + 1} \sum_{\{p=i\}}^{j} h_p$$

$$h_2 = \frac{1}{l - k + 1} \sum_{\{p=l\}}^{k} h_p$$

Also, the CLS token is embedded as $h_0$.

The vector representations 315 of the subject and object spans are passed to a fully connected layer with activation function (reference numeral 316). However, although the BERT model 327 generates the tokens of the mid-context, no further computation is performed on these tokens and the information about the mid-context is not passed to the fully connected layer with activation function (reference numeral 316).

When the vector representations 315 of the subject and object spans are passed to a fully connected layer with activation function (reference numeral 316), the activation function and the fully connected are applied to obtain:

$$g_1 = W_1 \tanh(h_1) + b_1$$

$$g_2 = W_2 \tanh(h_2) + b_2$$

A simplification is done by setting up the matrices as follows, $W_1 = W_2 = W$ and $b_1 = b_2 = b$.

The activation function and the fully connected are also applied on a vector representation of the CLS:

$$g_0 = W_0 \tanh(h_0) + b_0$$

The vector representations are concatenated and passed to the feedforward network (FFN) and linear layer of the fully connected layer 216 to obtain:

$$h_r'' = w_3^T \tanh([g_0|g_1|g_2]) + b_3,$$

for a particular relation r connecting target spans $s_1$ and $s_2$, where $W_3$ is a vector.

The softmax layer 218 produces probability:

$$p(r|s_1, s_2) = \exp(h_r'') / \sum_{\{r' \in R\}} \exp(h_{r'}'')$$

where R is the set of all relation types.

The above technique is problematic in that the computation needs to be repeated for each pair of target spans, e.g., in the case when it is desirable to predict multiple pairs of relations in one pass (batch prediction). For example, although the span corresponding to the entity "hypertension" is present in the input sentence 210, the RE extraction system 300 is not capable of processing more than one pair of target spans in the same computation.

B. Relation Extraction Using R-BERT for Batch Processing

Figure 4:
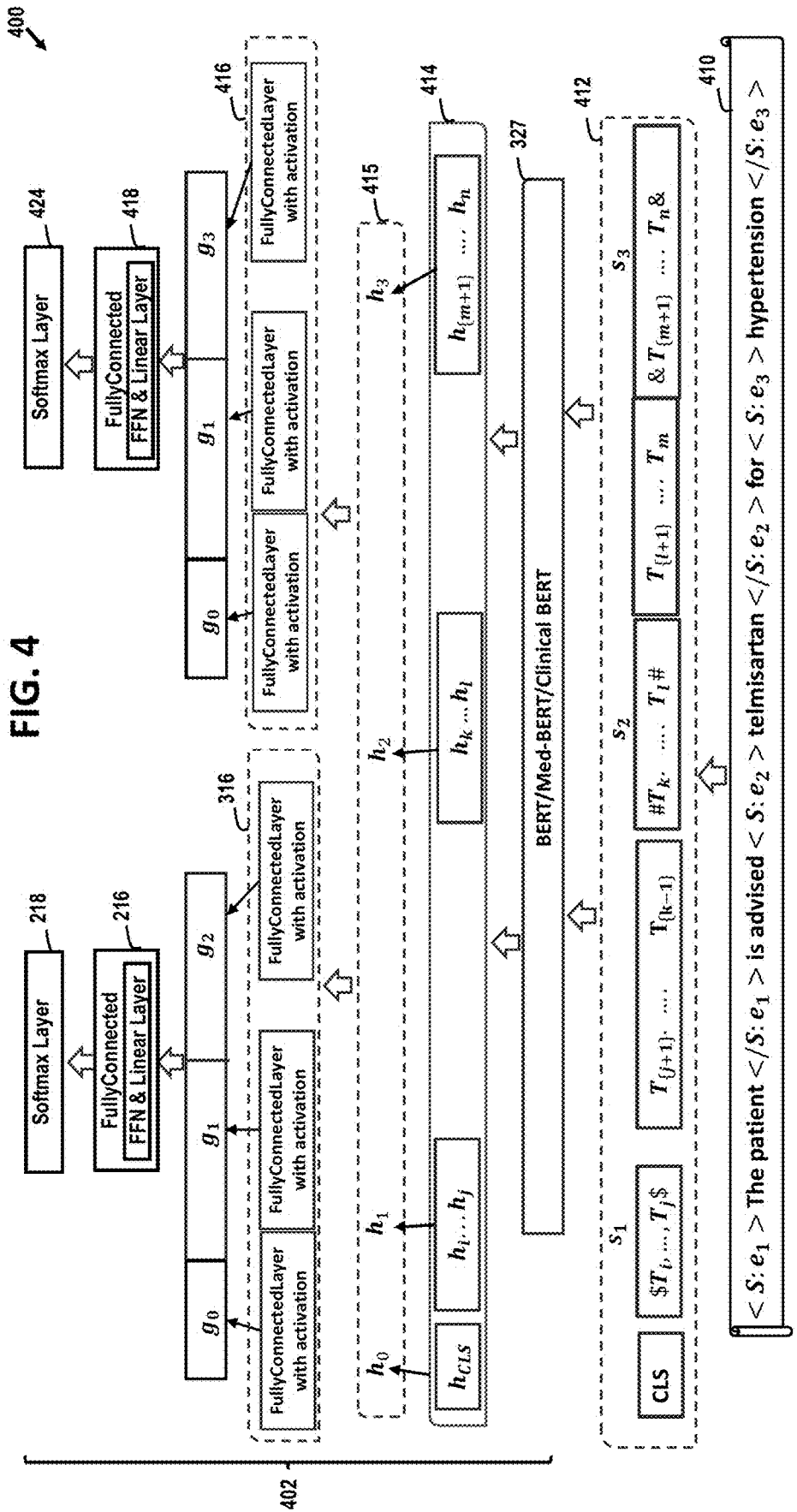
FIG. 4 is a simplified block diagram of a relation extraction system using R-BERT.

FIG. 4 shows a diagram of an example of an RE extraction system 400 including an R-BERT model 402 for batch computation that can be based on the RE extraction system 300 of FIG. 3.

In FIG. 4, a labeled sentence 410 indicates an output of the NER task, similarly to an example shown in FIG. 3. The first target span of the labeled sentence 410, e.g., "The patient," is indicated by markers <S:e1> at the beginning of the first target span and markers </S:e1> at the end of the first target span. The second target span of the labeled sentence 410, e.g., "telmisartan," is indicated by markers <S:e2> at the beginning of the second target span and markers </S:e2> at the end of the second target span. The third target span of the labeled sentence 410, e.g., "hypertension," is indicated by markers <S:e3> at the beginning of the third target span and markers </S:e3> at the end of the third target span. In-between the target spans, there are two mid-context spans "is advised" and "for."

The labeled sentence 410 is passed to a tokenizer 412. The tokenizer 412 is configured to convert the words of each of the spans into tokens. As shown, a string $ T_i, . . . , T_j$ corresponds to the first target span s1, a string $T_{\{j+1\}} . . . T_{\{k-1\}}$ corresponds to the first mid-context span "is advised," a string #T_k . . . T_j# corresponds to the second target span s2, a string $T_{\{l+1\}} . . . T_m$ corresponds to the second mid-context span "for," and a string & $T_{\{m+1\}} . . . . T_j$& corresponds to the third target span s3.

Similarly to FIG. 3, a special token "$" is inserted at the beginning and end of the first target span (which correspond to markers <S:e1> and </S:e1> respectively) and a special token '#' is inserted at the beginning and the end of the second target span (which correspond to markers <S:e2> and </S:e2> respectively). Additionally, a special token "&" is inserted at the beginning and end of the third target span (which correspond to markers <S:e3> and </S:e3> respectively).

The tokenized spans output by the tokenizer 412 may be passed to the BERT model 327. The BERT model 327 can capture the location information of the first, second and third target spans having entity types e1, e2, and e3, based on the special tokens inserted at the beginning and the end of the first, second, and third target spans.

The output of the BERT model 327 is token embeddings 414. For example, the tokens appearing in the first target span $s_1$ are represented as $h_i, \ldots, h_j$, where $h_i$ represents the first token and $h_j$ the last token in the first target span. The tokens appearing in the second target span $s_2$ are represented as $h_k, \ldots, h_l$. The tokens appearing in the third target span $s_3$ are represented as $h_{m+1} \ldots h_l$. The tokens appearing in the first mid-context span are represented as $h_{\{j+1\}} \ldots h_{\{k-1\}}$ and the tokens appearing in the second mid-context span are represented as $h_{\{l+1\}} \ldots h_m$.

Then, the token embeddings are averaged over all representative tokens in the target spans to get vector representations 415 of the target spans (e.g., subject and object spans) and the CLS.

The triples of the vector representations 415, e.g., $\{h_0, h_i, h_2\}$ and $\{h_0, h_1, h_3\}$, are passed to fully connected layer with activation function (reference numerals 316, 416) to apply an activation function on vector representations, similarly to what is described above with reference to FIG. 3. However, this is not intended to be limiting. For example, other triples of the vector representations of the tokens derived for the target spans of the input chunk of text are also can be input to the fully connected layer with activation function, e.g., $\{h_0, h_2, h_3\}$.

Although two fully connected layers with activation function (reference numerals 316, 416) are illustrated in FIG. 4, this is not intended to be limiting. For example, one fully connected layer with activation function can be used.

The vector representations are concatenated. For example, each concatenation may include the vector representations of a pair of target spans (e.g., subject span and object span) and the vector representation of the CLS:

$$[g_0|g_1|g_2]$$

$$[g_0|g_1|g_3]$$

The concatenations are passed to the fully connected layers 216, 418 and then to the softmax layers 218, 424 to obtain the probability of a given relation between the given pair of target spans, as described above with reference to FIGS. 1 to 3.

Although FIG. 4 shows two connected layers 216, 418 and two softmax layers 218, 424, this is not intended to be limiting. For example, one fully connected layer and/or one softmax layer can be used.

In the above technique, it is possible to compute a relation type for each pair of target spans appearing in the text. However, this technique is problematic.

For example, the CLS token embeddings for more than one relation prediction scenario should be different. For example, when cross sentence relationship is considered, one relation may be formed using the first sentence and another relation may span over two sentences. For example, consider the input text, "The patient is advised Telmisartan. He is having hypertension for the last two months." Examples of the relations from this text can be: Relation 1: Drug_advised_for_patient (The patient (PERSON), Telmisartan (Drug)). Relation 2: Drug_for_disease (Hypertension (disease), Telmisartan (Drug)). The CLS tokens should ideally compute self-attention from other tokens using the following text fragments:

Relation 1: CLS: The patient is advised Telmisartan.

Relation 2: CLS: The patient is advised Telmisartan. He is having hypertension for the last two months.

In the above-described technique, for batch prediction of relations, it may be very difficult to place different CLS tokens in two different places. For example, it might be difficult to set the length of context for each CLS token. Additionally, the number of CLS tokens may grow with an increase in the number of relations in the input text.

Further, in the situations involving cross-sentence relationship prediction, it is desirable to have a representation of tokens appearing in between subject and object entity spans which will act as context. However, in the existing framework of R-BERT there is no provision for mid-context computation and, thus, the accuracy of the calculations may suffer.

C. Relation Extraction Using Modified R-BERT

Figure 5A:
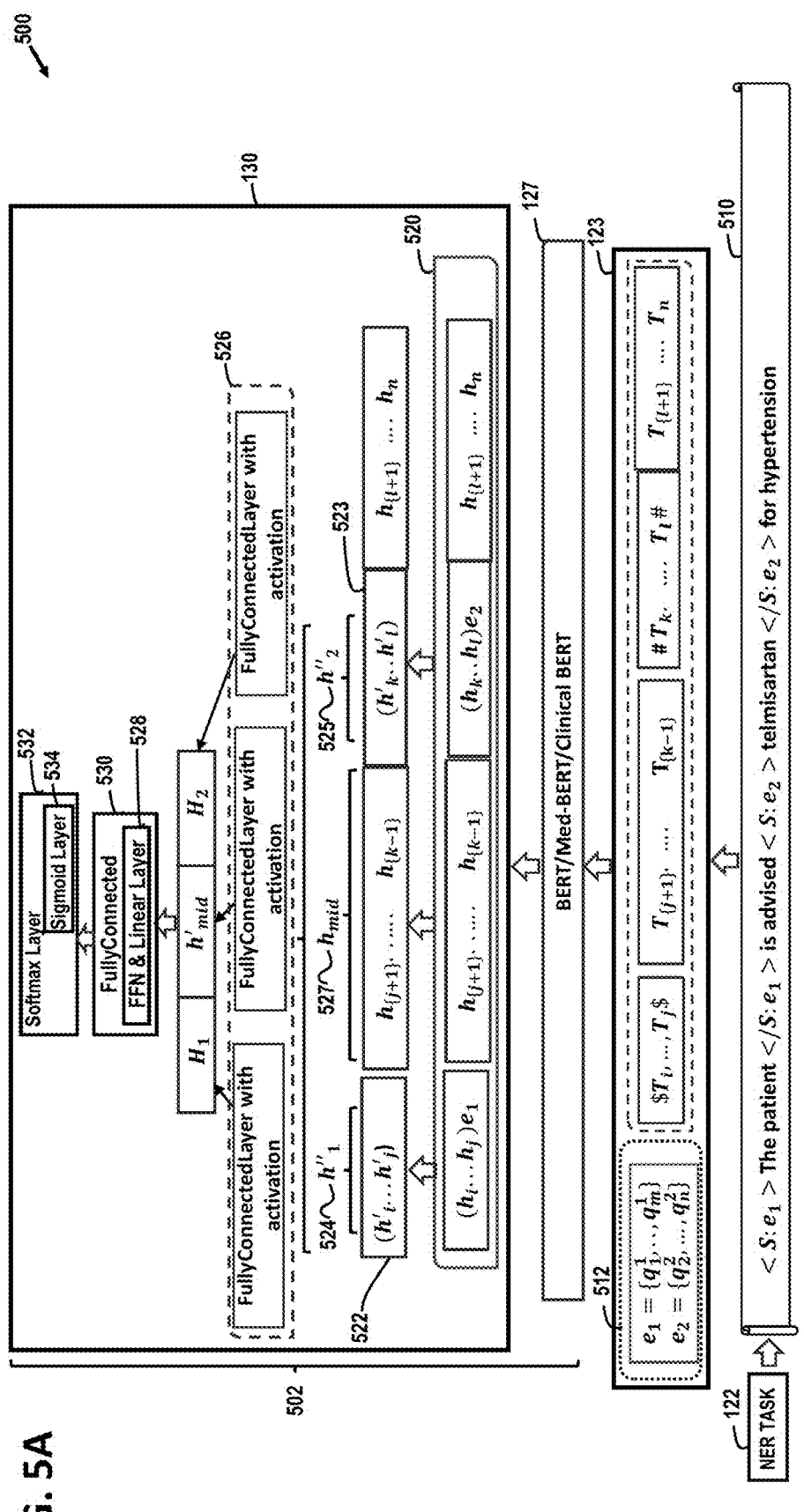
FIG. 5A is a simplified block diagram of a relation extraction system using a modified R-BERT according to at least one embodiment.

FIG. 5A shows a diagram of an example of a relation extraction system 500 that includes a modified R-BERT model 502 according to at least one embodiment. For example, the relation extraction system 500 may correspond to the relation extraction subsystem 104.

By using the novel modified R-BERT model 502, the relation extraction system 500 is capable of extracting the relation type in one pass for all of the target pairs present in at least one sentence as described in detail below. However, with reference to FIG. 5A, for simplicity of description, the processing with respect to one target pair is described below.

When the chunk of text (e.g., input sentence 210) is input to the NER task 122, the NER task 122 processes the sentence and outputs the labeled sentence 510.

The first target span of the labeled sentence 510, e.g., "The patient," is indicated by markers <S:e1> at the beginning of the first target span and markers </S:e1> at the end of the first target span. In an example, the first target span may be the subject span. The second target span of the labeled sentence 510, e.g., "telmisartan," is indicated by markers <S:e2> at the beginning of the second target span and markers </S:e2> the end of the second target span. The second target span may be the object span. In-between the first and second target spans, there is a mid-context span "is advised."

The labeled sentence 510 is passed to a tokenizer 123. Similarly to what is described above, the tokenizer 123 is configured to convert the words of each of the spans into tokens. In FIG. 5A, a string $ T_i, \ldots, T_j$ corresponds to the first target span s1, a string $T_{\{j+1\}} \ldots T_{\{k-1\}}$ corresponds to the mid-context span "is advised," and a string #$T_k \ldots T_l$ # corresponds to the second target span s2. As mentioned above, although the RE relation extraction system 500 is capable of processing all target spans present in chunk of text, for simplicity of description of an embodiment of FIG. 5A, the processing is described below with respect to the first target span, the second target span, and the first mid-context span disposed between the first target span, e.g., subject span, and the second target span, e.g., object span. Accordingly, the processing corresponding to the third target span and the second mid-context span is not described with reference to FIG. 5A.

In an embodiment, in comparison to FIGS. 3 and 4, the special token "CLS" is not generated. Instead, the tokenizer 123 generates an intermediate token representation 512 of the entity types for the pair of target spans in the same latent space as is used for generating embeddings for span tokens.

$$e_1 = \{q_1^1, \ldots, q_m^1\},$$
$$e_2 = \{q_2^2, \ldots, q_m^2\}$$

The tokenized spans and the intermediate token representation 512 of the entity types for the pair of target spans, which are output by the tokenizer 123, may be passed to the pre-trained language model 127. The pre-trained language model 127 can capture the location information of the first and second entities e1 and e2, based on the special tokens inserted at the beginning and the end of the first and second target spans.

The output of the pre-trained language model 127 is token embeddings associated with the words of the first target span, the first mid-context span, the second target span, and the entity types for the first target span and the second target span. A shown in FIG. 5A, the tokens of the first mid-context span are represented as $h_{\{j+1\}} \ldots h_{\{k-1\}}$, based on which the mid-context representation 527 is generated. The generation of the mid-context representation 527 is described in detail below.

The token embeddings from the pre-trained language model 127 are passed to a soft attention layer 520 where the entity specific information corresponding to the entity type e1 of the entity of the first target span is integrated with the token embeddings $h_i, \ldots, h_j$ corresponding to the tokens appearing in the first target span $s_1$, as shown in FIG. 5A by the expression $(h_i \ldots h_j)e_1$. The entity specific information corresponding to the entity type e2 of the entity of the second target span is integrated with the token embeddings $h_k, \ldots, h_l$ corresponding to the tokens appearing in the second target span $s_2$, as shown in FIG. 5A by the expression $(h_k \ldots h_l)e_2$.

The output of the soft attention layer 520 is entity-focused span embedding representations 522, 523 corresponding to the first target span and the second target span:

$$(h_1' \ldots h_j')$$
$$(h_k' \ldots h_l')$$

The generation the entity-focused span embedding representations 522, 523 are described below.

Generation of Mid-Context Representation

As mentioned above, the output of the pre-trained language model 127 may be represented as $h_i, \ldots, h_j$ for the first target span $s_1$, e.g., the subject span, and $h_k, \ldots, h_l$ for the second target span $s_2$, e.g., the object span.

The entire text may be represented using token embeddings as:

$$\ldots, h_i, \ldots, h_j, h_m^1, \ldots, h_m^p, h_l, \ldots, h_k, \ldots$$

where $$h_m^1, \ldots, h_m^p$$

correspond to embedding of m tokens of the mid-context span that appear between the tokens of the subject span $s_1$ and the object span $s_2$.

A mid-context representation 527 may be generated as an average embedding representation of the token representations of the mid-context:

$$h_{mid} = \left( \sum_{\{c=1\}}^{p} h_m^c \right) \bigg/ p$$

where p is a number of mid-context words appearing between the subject span and the object span of a pair of target spans.

Herein, the mid-context representation 527 may also be referred to as a mid-context computation.

Generation of Entity-Focused Span Embedding Representations

In order to generate the entity-focused span embedding representations 522, 523 of the target spans, the entity specific information, e.g., entity type, is integrated into the token embeddings for the target spans.

For computing the entity-focused span embedding representations corresponding to each target span, three components are considered according to embodiments:

(1) entity independent span token embedding,
(2) span-aligned entity embedding, and
(3) span-independent entity representation.

(1) Entity Independent Span Token Embedding

For entity independent span token embedding, the token embedding of each token in the span $s_i$ is maintained, e.g., as output by the pre-trained language model 127.

(2) Span-Aligned Entity Embedding

For span-aligned entity embedding, a fixed-length representation of the entity based on the soft alignment with the span token is used. The alignments are computed through neural attention, for which an attention score is computed on the dot product between non-linear mappings of the token embeddings (e.g., soft attention).

Assume the token representations of the span to be $s_i = \{h_1, h_2, \ldots, h_m\}$.

The tokens for an entity type e can be represented as a sequence of embedded tokens $\{q_1, q_2, \ldots, q_n\}$. For example, this sequence may be obtained by using the pre-trained language model 127 on the intermediate token representation 512 of the tokens of the entity type of the target span.

Then, the attention score between the token $h_i$, $1 \leq i \leq m$ for the target span and the token $q_j$, appearing in the entity type are computed using the following equations:

For each $1 \leq i \leq m$:

$$s_{\{ij\}} = [(h_i)]^T (q_j), 1 \leq j \leq n$$

$$a_{\{i,j\}} = \frac{\exp(s_{\{i,j\}})}{\sum_{\{k=1\}}^{n} \exp(s_{\{ik\}})} 1 \leq j \leq n$$

The normalized importance scores $a_{\{ij\}}$, $1 \leq i \leq m$, $1 \leq j \leq n$ are used to weight the representation of entity type tokens and get a single attention vector of n tokens for each of the tokens in the target span to obtain a span-aligned entity embedding:

$$q_i^{(align)} = \sum_{(j=1)}^{n} a_{(ij)} q_j, \; 1 \le i \le m$$

(3) Span-Independent Entity Representation

For span independent entity representation, a representation of an entity type that does not depend on the target span is included. Similarly to the case of span-aligned entity embedding, an attention score is computed using dot product, except that the entity type token is compared to a universal learned embedding rather any particular token in a target span.

Additionally, the contextual information produced through a feedforward neural (FFN) network before aggregating the outputs with the attention mechanism is incorporated. This aims to generate coarse-grained summary of the entity that depends on word order.

Assume that an FFN network on the input of tokens $\{q_1, q_2, \ldots, q_n\}$ of an entity type produces the embeddings, $$FFN(q) = \{q'_1, q'_2, q'_n\}.$$

A linear layer is applied on each of the output tokens, to obtain:

$$s_j = w_q LinLayer_E(q'_j).$$

In one embodiment, the FFN and the linear layer for computing the span independent entity representation may be incorporated into the soft attention layer 520. However, this is not intended to be limiting. For example, in certain implementations, the FFN and the linear layer for computing the span independent entity representation may be different from the soft attention layer 520.

Then:

$$a_j = \frac{\exp(s_j)}{\sum_{(k=1)}^{n} \exp(s_k)}$$

Finally, the span-independent entity representation is $$q^{(indep)} = \sum_{(j=1)}^{n} a_j q'_j.$$

The complete entity-focused span embedding representation corresponding to $h_i$ (which is generated by the pre-trained language model 127) is given as $$h'_i = [h_i; q_i^{(align)}; q_{(indep)}], \; i = 1, 2, \ldots, m$$

The entity-focused span embedding representations 522, 523 are averaged over all the representative tokens in the target spans to get an entity-focused representation of the target spans:

18

$$h''_1 = \frac{1}{j-i+1} \sum_{(p=i)}^{j} h'_p$$

(the target span is assumed to be spread from i to j tokens)

$$h''_2 = \frac{1}{l-k+1} \sum_{(p=k)}^{l} h'_p$$

(the target span is assumed to be spread from k to l tokens)

The fully connected layer with activation function (reference numeral 526) applies an activation function on the mid-context representation 527 and the entity-focused span embedding representations 524, 525 of the target spans, to obtain:

$$h'_{mid} = W_{mid} \tanh(h_{mid}) + b_{mid}$$
$$H_1 = W_1 \tanh(h''_1) + b_1$$
$$H_2 = W_2 \tanh(h''_2) + b_2$$

The concatenated representation is generated as $h_{\{intermediate\}} = [H_1 | h'_{mid} | H_2]$.

Then, $h_r(s_i, s_j)$ is set as $h_{\{intermediate\}}$ and passed to the feedforward network (FFN) and linear layer 528 of the fully connected layer 530 to obtain $$g_r = w_3^T \tanh([H_1 | h'_{MID} | H_2]) + b_3,$$

for a particular relation r connecting target spans $s_1$ and $s_2$.

Although FIG. 5A, illustrates three fully connected layer with activation function (reference numeral 526) in correspondence to each of $h''_1$, $h''_2$, and $h_{mid}$, this is not intended to be limiting. In some implementations, a different number of fully connected layers with activation function may be used, e.g., 1, 2 . . . , n.

As mentioned above, although the BERT model 327 of R-BERT of FIGS. 3 and 4, generates the tokens of the mid-context, no further computation is performed on these tokens and the information about the mid-context is not passed to the fully connected layer with activation function and the fully connected layer at the output of the RE task.

The softmax layer 532 produces the probability distribution for each relation for each target pair of the input text:

$$P(r | s_1, s_2) = \exp(g_r) / \sum_{\{r' \in R\}} \exp(g_{r'})$$

where R is the set of all relation types.

Accordingly, for a chunk of input text, after the probability distribution of the relation connecting each pair of target spans is computed, a given relation for a pair of target spans is predicted based on the probability distribution if the probability of that relation is maximum of all relations including a null relationship.

However, the described-above is not intended to be limiting. In certain implementations, it may be determined that a certain pair of target spans can share only one possible relation type from the set of relation types 114.

The probability for a pair of target spans sharing only one possible relation is computed as $P(r|(s_1, s_2)=\sigma(gr)$, where $\sigma(\cdot)$ is a sigmoid function. If the probability exceeds the threshold (e.g., 0.55), then the candidate relation type is determined to be a relation connecting the subject span and the object span of the pair of target spans under consideration. The value of sigmoid function is from 0 to 1 and the threshold value can be adjustable.

In one embodiment, the sigmoid layer 534 may be incorporated into the softmax layer 532 as shown in FIG. 5A. However, this is not intended to be limiting. In some implementations, the sigmoid layer 534 may be separate from the softmax layer 532.

If the problem of relation prediction is modeled as a multi-class classification problem, then softmax value is used as the probability distribution of the relation. If the relation prediction is modeled as a binary classification problem (e.g., in case there is only relation possible between two entities), then the sigmoid function is used for the computation of the probability distribution of relation. In such scenarios, the sigmoid layer 534 can be used instead of the softmax layer 532.

The training stage proceeds similarly to techniques described above with reference to FIG. 5A. The loss function is formulated as: $L=\Sigma_D\Sigma_{\{r\in R\}}\Sigma_{\{(s_1, \ s_2)\in S\times S\}}$ log $P(r|(s_1, s_2)$ which is subjected to maximization. The loss function is computed for each relation for each target pair of the input text.

In the manner described above, unlike the related art techniques, in the embodiments, the information specific to the entity type is passed to the fully connected layer with activation function (reference numeral 526), e.g., via the span-aligned entity embedding $$q_i^{\{align\}}$$

and the span-independent entity representation is $q^{\{indep\}}$. Likewise, the mid-context computation $h_{mid}$ is passed to the fully connected layer with activation function (reference numeral 526). Then, as described above, the products of these computations are passed to the fully connected layer 530 and the softmax layer 532.

In embodiments, the modified RE task 130 of FIG. 1 may be at least a portion of the modified R-BERT model 502. For example, the modified RE task 130 may include the soft attention layer 520, the fully connected layer with activation function (reference numeral 526), the fully connected layer 530, and the softmax layer 532.

In embodiments, the NER task 122, the pre-trained language model 127, and the modified RE task 130 may be incorporated into a pre-trained ML model. However, this is not intended to be limiting. For example, in some implementations, the NER task 122 and the pre-trained language model 127 can be separate models that are networked with the modified RE task 130.

D. Relation Extraction Using Modified R-BERT for Batch Processing

Figure 5B:
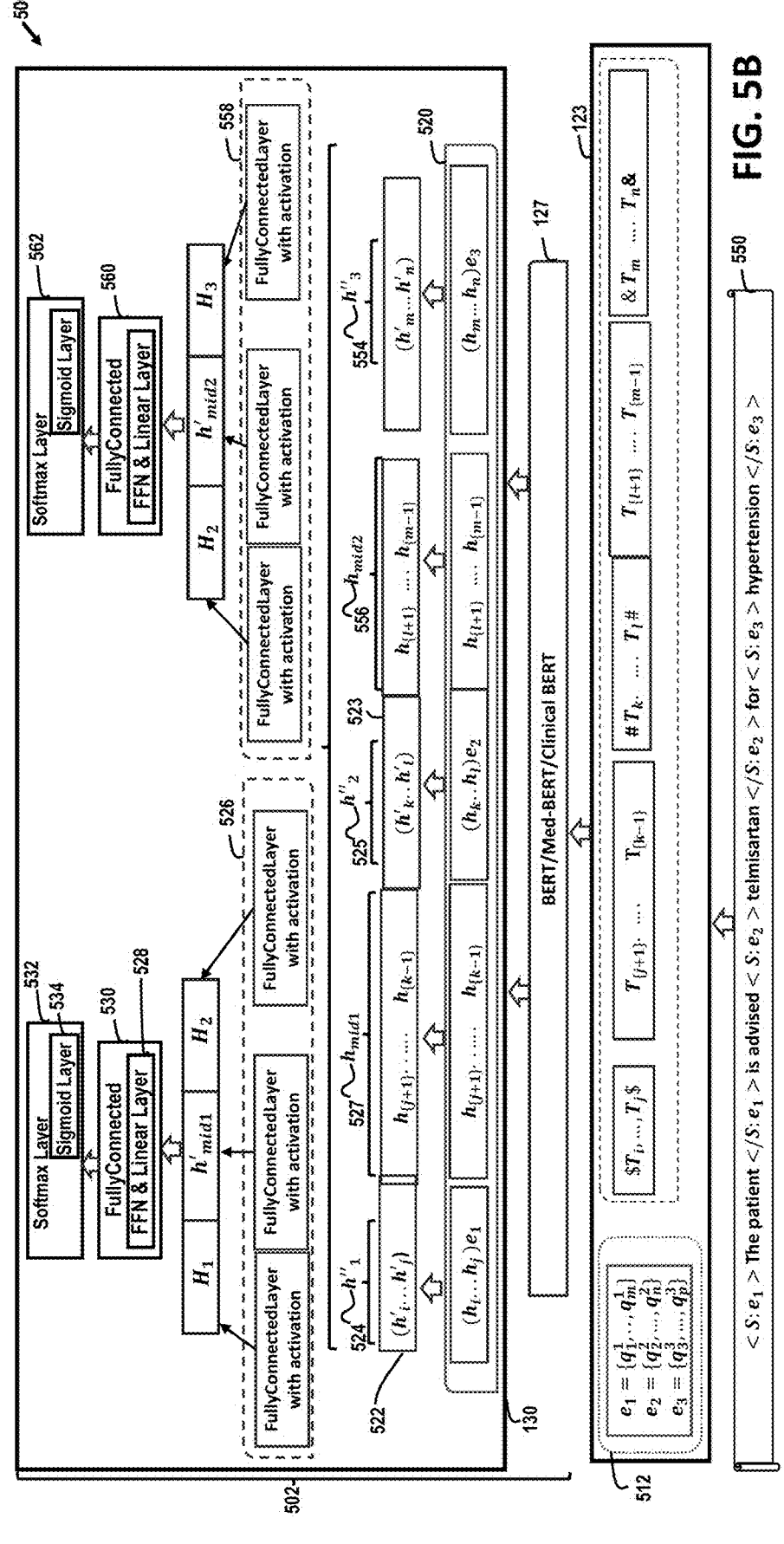
FIG. 5B is a simplified block diagram of a relation extraction system using a modified R-BERT for batch processing according to at least one embodiment.

FIG. 5B is a simplified block diagram of the relation extraction system 500 using a modified R-BERT of FIG. 5A for batch processing according to at least one embodiment. Since the processing performed by the modified R-BERT is described above with reference to FIG. 5A, some of the detailed descriptions will not be repeated here.

In FIG. 5B, a labeled sentence 550 indicates an output of the NER task 122, similarly to an example shown in FIGS.

3 to 5A. The first target span of the labeled sentence 550, e.g., "The patient," is indicated by markers <S:e1> at the beginning of the first target span and markers </S:e1> at the end of the first target span. The second target span of the labeled sentence 550, e.g., "telmisartan," is indicated by markers <S:e2> at the beginning of the second target span and markers </S:e2> at the end of the second target span. The third target span of the labeled sentence 550, e.g., "hypertension," is indicated by markers <S:e3> at the beginning of the third target span and markers </S:e3> at the end of the third target span. In-between the target spans, there are two mid-context spans "is advised" and "for."

The labeled sentence 550 is passed to a tokenizer 123. The tokenizer 123 is configured to convert the words of each of the spans into tokens. As shown, a string $\$T_i, \ldots, T_j\$$ corresponds to the first target span s1, a string $T_{\{j+1\}} \cdots T_{\{k-1\}}$ corresponds to the first mid-context span "is advised," a string $\#T_k \ldots T_l\#$ corresponds to the second target span s2, a string $T_{\{l+1\}} \cdots T_{\{m-1\}}$ corresponds to the second mid-context span "for," and a string $\& \ T_m \ldots T_n\&$ corresponds to the third target span s3.

Similarly to FIG. 4, a special token "$" is inserted at the beginning and end of the first target span, in correspondence to markers <S:e1> and </S:e1>, a special token '#' is inserted at the beginning and the end of the second target span, in correspondence to markers <S:e2> and </S:e2>, and a special token "&" is inserted at the beginning and end of the third target span, in correspondence to markers <S:e3> and </S:e3>.

As described above, in an embodiment, in comparison to FIGS. 3 and 4, the special token "CLS" is not generated. Instead, the tokenizer 123 generates an intermediate token representation 512 of the entity types for the target spans in the same latent space as is used for generating embeddings for span tokens.

$$e_1 = \{q_1^1, \ldots, q_m^1\},$$
$$e_2 = \{q_2^2, \ldots, q_n^2\}$$
$$e_3 = \{q_3^3, \ldots, q_p^3\}$$

The tokenized spans and the intermediate token representation 512 of the entity types for the target spans, which are output by the tokenizer 123, may be passed to the pre-trained language model 127. The pre-trained language model 127 can capture the location information of the first, second, and third entities corresponding to entity types e1, e2, and e3 based on the special tokens inserted at the beginning and the end of the first, second, and third target spans.

The output of the pre-trained language model 127 is token embeddings associated with the words of the first target span, the first mid-context span, the second target span, the second mid-context span, the third target span, and the entity types for the first, second, and third target spans.

The token embeddings from the pre-trained language model 127 are passed to a soft attention layer 520 where the entity specific information corresponding to the entity type e1 of the entity of the first target span is integrated with the token embeddings $h_i, \ldots, h_j$ corresponding to the tokens appearing in the first target span $s_1$, as shown in FIG. 5B by the expression $(h_i \ldots h_j)e_1$. The entity specific information corresponding to the entity type e2 of the entity of the second target span is integrated with the token embeddings $h_k, \ldots, h_l$ corresponding to the tokens appearing in the second target span $s_2$, as shown in FIG. 5B by the expression $(h_k \ldots h_l)e_2$. The entity specific information corresponding to the entity type e3 of the entity of the third target span is integrated with the token embeddings $h_m, \ldots, h_n$ corresponding to the tokens appearing in the second target span $s_3$, as shown in FIG. 5B by the expression $(h_m \ldots h_n)e_3$.

The output of the soft attention layer 520 is entity-focused span embedding representations 522, 523, 554, which are generated in correspondence to the first target span, the second target span, and the third target span:

$$(h'_1 \ \ldots \ h'_j)$$

$$(h'_k \ \ldots \ h'_l)$$

$$(h'_m \ \ldots \ h'_n)$$

The techniques for generating entity-focused span embedding representations 522, 523, 554 are described above with reference to FIG. 5A.

The entity-focused span embedding representations 522, 523, 554 are averaged over all the representative tokens in the target spans to get an entity-focused representation of the target span:

$$h''_1 = \frac{1}{j-i+1} \sum\nolimits_{\{p=i\}}^{j} h'_p$$

(the target span is assumed to be spread from i to j tokens)

$$h''_2 = \frac{1}{l-k+1} \sum\nolimits_{\{p=k\}}^{l} h'_p$$

(the target span is assumed to be spread from k to l tokens)

$$h''_3 = \frac{1}{m-n+1} \sum\nolimits_{\{p=n\}}^{m} h'_p$$

(the target span is assumed to be spread from m to n tokens)

The mid-context representations 527, 556 are generated similarly to what is described above with reference to FIG. 5A, based on the first mid-context span and the second mid-context span, respectively.

The fully connected layers with activation function (reference numerals 526, 558) apply an activation function on the mid-context representations 527, 556 and the entity-focused span embedding representations 524, 525, 554 of the target spans, to obtain:

$$h'_{mid1} = W_{mid1} \tanh(h_{mid1}) + b_{mid1}$$

$$h'_{mid2} = W_{mid2} \tanh(h_{mid2}) + b_{mid2}$$

$$H_1 = W_1 \tanh(h''_1) + b_1$$

$$H_2 = W_2 \tanh(h''_2) + b_2$$

$$H_3 = W_3 \tanh(h''_3) + b_3$$

The concatenated representations are generated as $h_{\{intermediate1\}} = [H_1 | h'_{mid1} | H_2]$ and $h_{\{intermediate2\}} = [H_2 | h_{mid2} | H_3]$.

The concatenated representations are passed to the fully connected layers 530, 560, and the softmax layers 532, 562 to obtain the probability of particular relations connecting the target spans $s_1$ and $s_2$, and target spans $s_2$ and $s_3$, respectively. These operations are described in detail above and will not be repeated.

As described above, the relation extraction system 500 can perform processing with respect to the pairs of target spans $\{s_1, s_2\}$ and $\{s_2, s_3\}$. However, the described above is not intended to be limiting. That is, since the relation determining system 100 is capable of determining all the relations of the input chunk of text in one pass, the relation extraction system 500 also can perform processing on the pair of target spans $\{s_1, s_3\}$. In this case, all or some of the mid-context words included in the mid-context spans appearing between the first target span $s_1$ and the third target span $s_3$ may be considered. Likewise, the relation extraction system 500 can perform processing with respect to all of the pairs of target spans present in the chunk of text that is input thereto.

As described above, the target spans form pairs, where one target span of the pair is a subject span and other target span of the pair is an object span. The target span, which is a subject span in one pair, can be considered as an object span in another target pair. However, the target spans of the same pair cannot flip.

IV. Shared Layer Architecture

Figure 6:
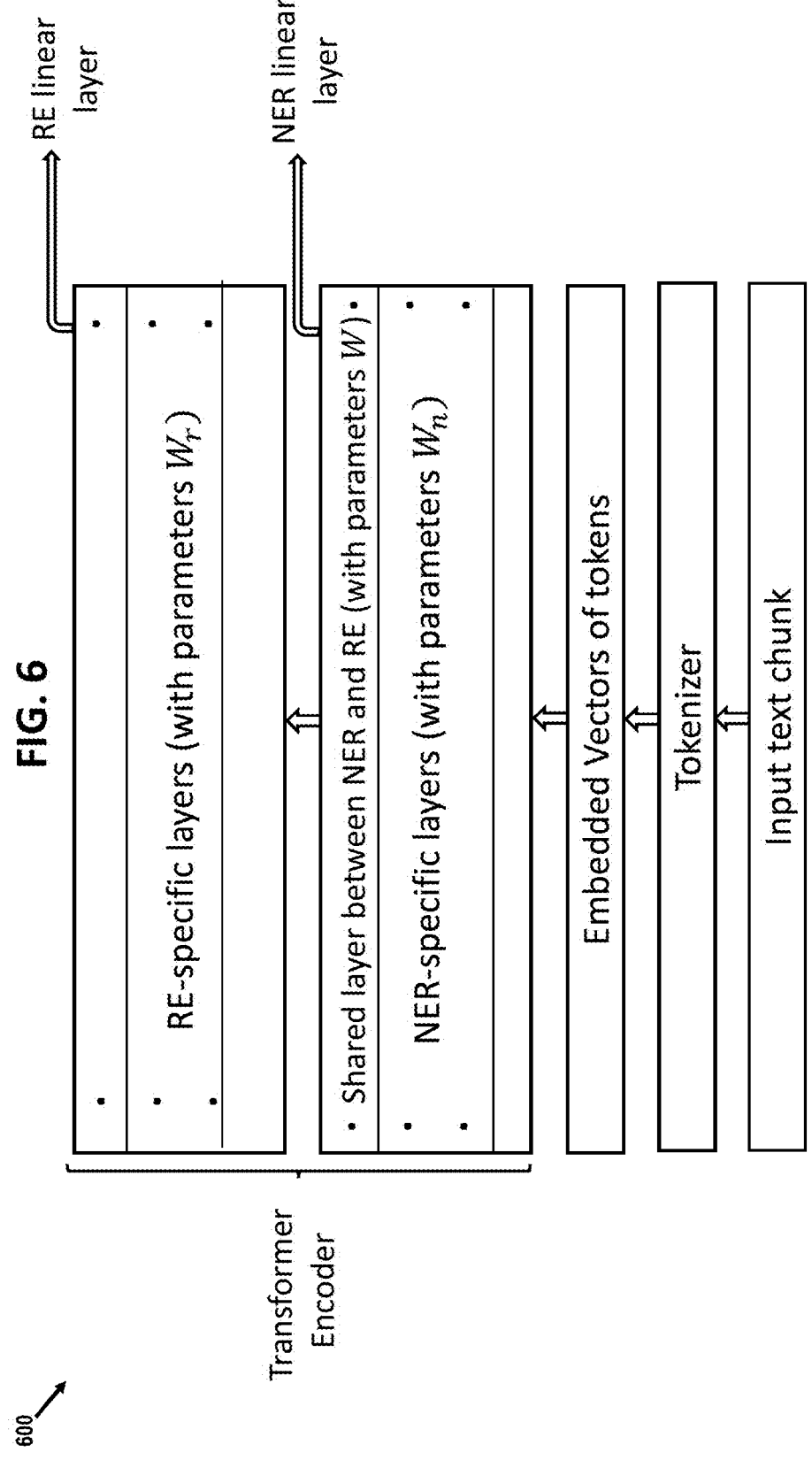
FIG. 6 is a simplified block diagram of a shared layer architecture for joint NER and RE tasks according to various embodiments.

FIG. 6 is a simplified block diagram of a shared layer architecture for joint NER and RE task according to various embodiments.

For example, an ML model 600 can be generated by jointly training the NER model and the RE model based on a modified R-BERT. In the shared layers, the first few layers can be used by the NER model and the remaining few layers can be shared by the RE model. The output embedding from the NER can be used as the input to the RE model. There can be few layers in between which are shared by both NER and RE in the sense that the parameters of these layers will be updated during training for both tasks.

In the shared model architecture for multi-task including NER, RE and the like, the NER may produce a contextualized output for piece of input text which has to be fed to the RE. In the examples described above, for the R-BERT, the entity markers are provided before and after the target spans. However, for contextualized representations of input text to RE, it may be difficult to insert entity markers at appropriate places, although the positional embedding information for the start token and end token of the span in question may be used. This would require de-coupling the use of entity markers on input text representations for RE. Also, explicit representation entities (in terms of the constituent token embeddings) would add more relevant information for RE prediction.

V. Usage of Relation Determining System

Figure 12:
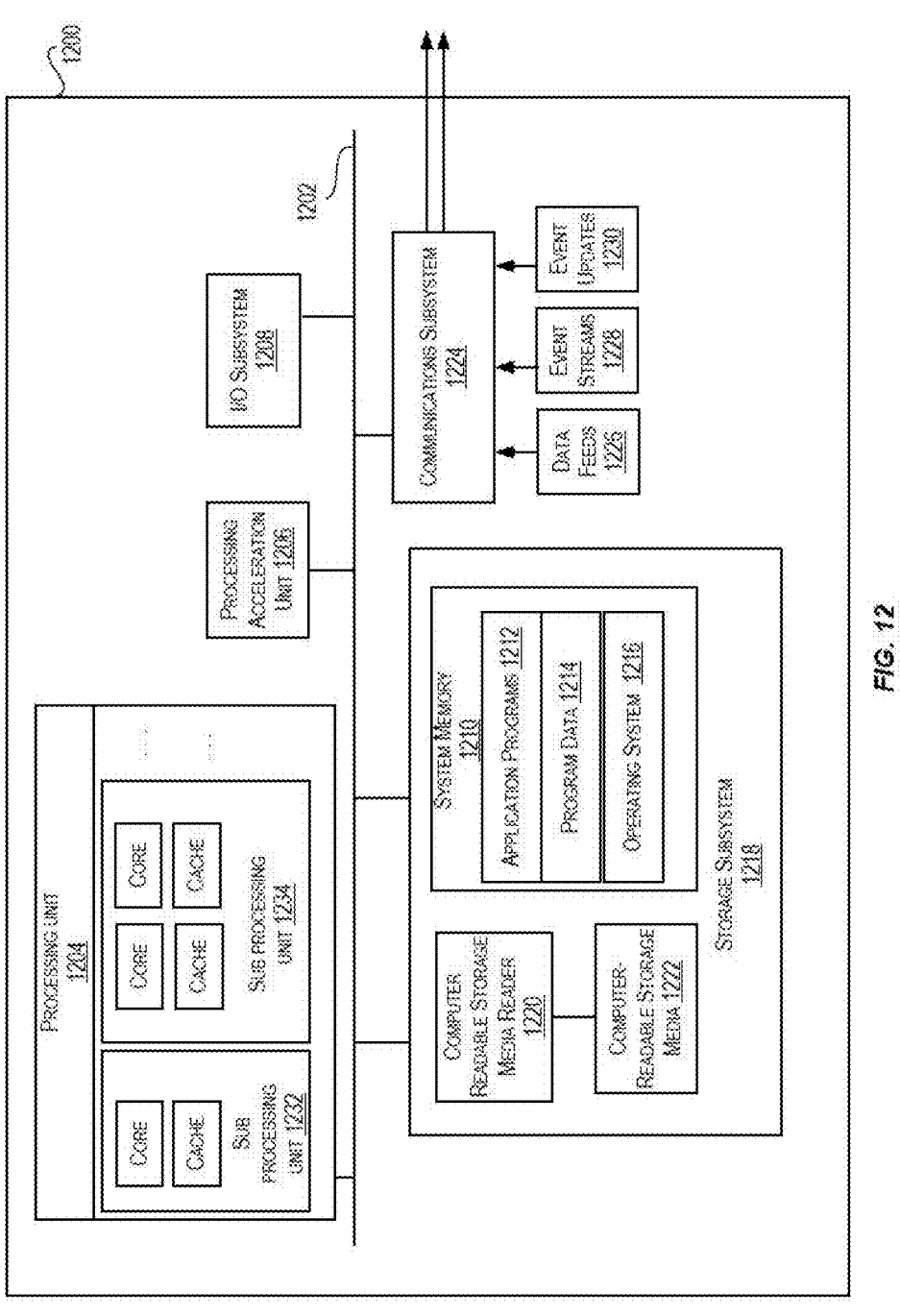
FIG. 12 is a block diagram illustrating an example computer system, according to at least one embodiment.

As shown in FIG. 13, the relation determining system 100 can be provided as a part of a distributed computing environment, where the relation determining system 100 is connected to one or more user computers 1326 via a communication network 1328. An example of a distributed computing environment is depicted in FIG. 12 and described in detail below.

Figure 14:
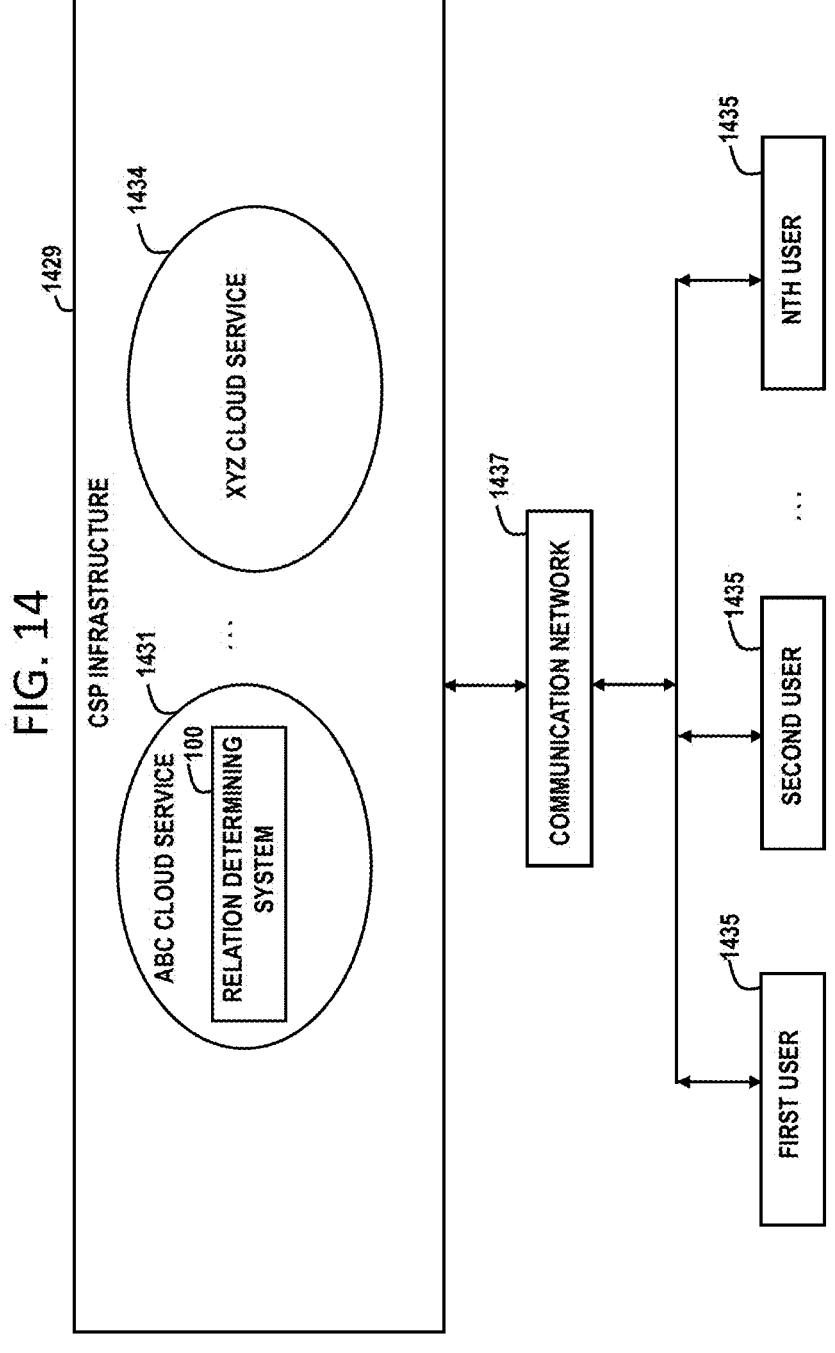
FIG. 14 is a simplified block diagram of a relation determining system in a cloud service provider (CSP) infrastructure according to various embodiments.

As shown in FIG. 14, the relation determining system 100 may be a part of a CSP infrastructure 1429 provided by a CSP for providing one or more cloud services. For example, the one or more cloud services may include ABC cloud service 1431 to XYZ cloud service 1434 connected to computers of one or more users 1435 via a communication network 1437. For example, the relation determining system 100 may be a part of the ABC cloud service 1431.

An example of a cloud infrastructure architecture provided by the CSP is depicted in FIGS. 8-11 and described in detail below.

VI. Method

FIG. 7 is a simplified block diagram of a processing 700 performed by the relation determining system 100 in accordance with various embodiments. The processing 700 may be performed by the span set preparation subsystem 102 and the relation extraction subsystem 104.

The processing 700 depicted in FIG. 7 may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7 and described below is intended to be illustrative and non-limiting. Although FIG. 7 depicts the various processing operations occurring in a particular sequence or order, this is not intended to be limiting. In certain alternative embodiments, the processing 700 may be performed in some different order or some operations may be performed at least partially in parallel.

Referring to FIG. 7, at operation 702, the relation determining system 100 may access text including a sequence of words, where a plurality of spans is identified within the text, each span of the plurality spans includes one or more words from the sequence of words, and the plurality of spans includes one or more pairs of target spans, each pair of the one or more pairs of target spans being associated with an entity type, each pair including a subject span and an object span, and one or more mid-context spans, each of the one or more mid-context spans appearing between a subject span and an object span that are included in each pair of the one or more pairs of target spans.

At operation 704, the relation determining system 100 may use a pre-trained ML model to generate embedding representations of tokens associated with one or more words appearing within each of the target spans, tokens associated with the entity types of each of the target spans, and tokens associated with one or more mid-context words appearing within each of the one or more mid-context spans.

At operation 706, the relation determining system 100 may use the pre-trained ML model to generate, for each of the target spans, an entity-focused span embedding representation based on the embedding representations of the tokens associated with each target span and the embedding representations of the tokens associated with the entity type of that target span.

In various embodiments, the entity-focused span embedding representations are generated by integrating information specific to the entity type with the embedding representations of the tokens associated with each target span using entity independent span token embedding, span-aligned entity embedding, and span-independent entity representation, where the entity independent span token embedding maintains the embedding of each token in a target span from the embedding representations of the tokens, the span-aligned entity embedding includes a fixed-length representation of an entity type based on soft alignment with tokens of a target span, and span-independent entity representation includes a representation of an entity type that does not depend on tokens of a target span.

At operation 708, the relation determining system 100 may use the pre-trained ML model to generate, for each of the one or more mid-context spans, a mid-context embedding representation based on the embedding representations of the tokens associated with each mid-context span.

In various embodiments, the method further includes applying, by a fully connected layer of the pre-trained ML model, activation functions on the entity-focused span embedding representations of the subject span and the object span and the mid-context embedding representation of the mid-context span appearing between the subject span and the object span for each pair of target spans to obtain activated entity-focused span embedding representations of the subject span and the object span and activated mid-context embedding representation for each pair of target spans.

In various embodiments, the method further includes, for each pair of target spans, generating, by the fully connected layer, a concatenation of the activated entity-focused span embedding representations of the subject span and the object span and the activated mid-context embedding representation associated with each pair of target spans.

At operation 710, the relation determining system 100 may use the pre-trained ML model to generate, for each pair of the one or more pairs of target spans, a probability distribution of each relation included in a set of relations based on entity-focused span embedding representations of a subject span and an object span that are included in each pair and the mid-context embedding representation for a mid-context span appearing between the subject span and the object span of the pair, the set of relations including a null relation.

The probability distribution of each relation for each pair of target spans may be generated based on the concatenation of the activated entity-focused span embedding representations of the subject span and the object span and the activated mid-context embedding representation associated with each pair of target spans.

In various embodiments, the generating of the probability distribution of each relation for each pair of target spans takes into consideration the information specific to the entity type integrated into the activated entity-focused span embedding representations of the subject span and the object span that are included in each pair of target spans.

At operation 712, the relation determining system 100 may use the pre-trained ML model to predict a given relation for a pair of target spans based on the probability distribution.

Example Cloud Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling OS, middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
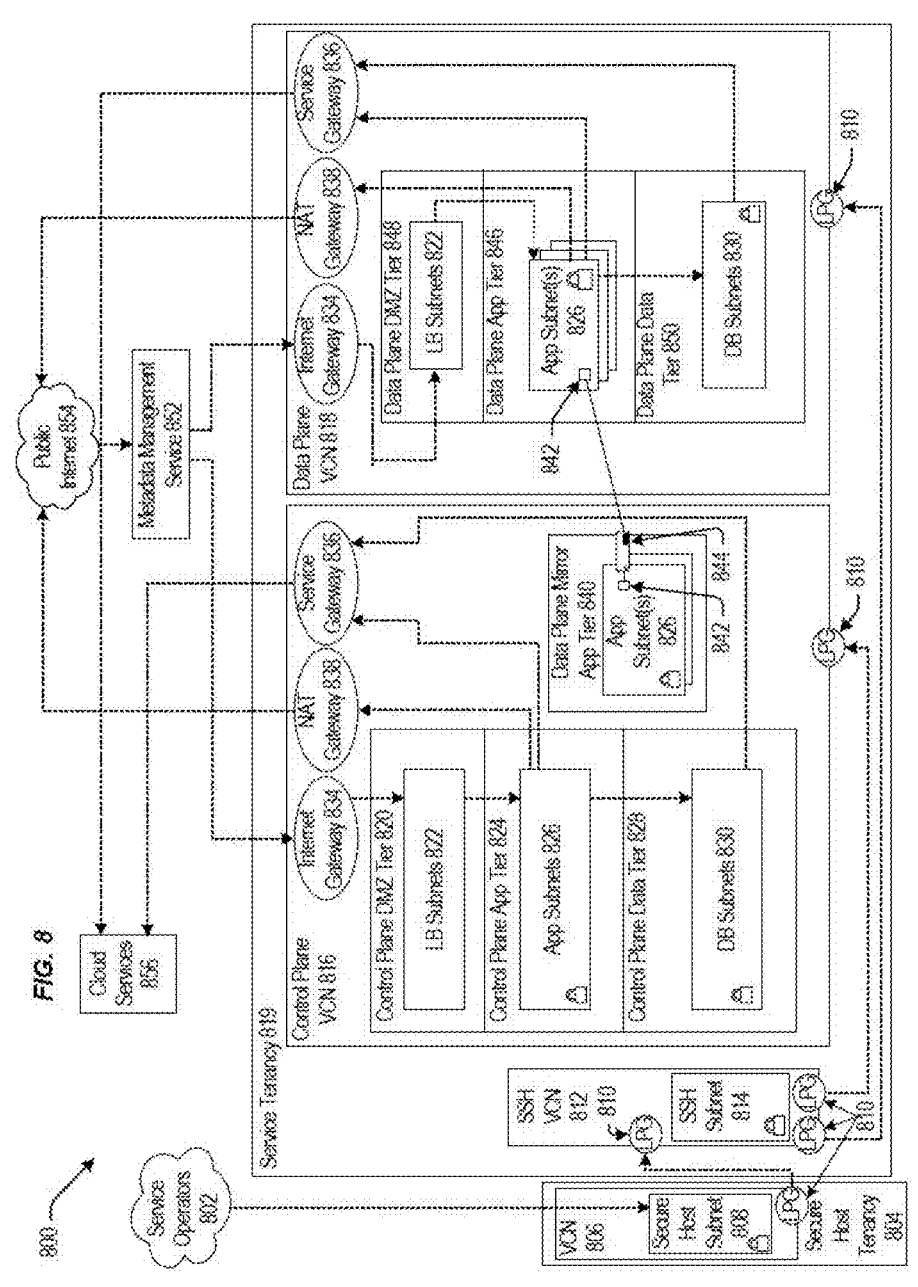
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
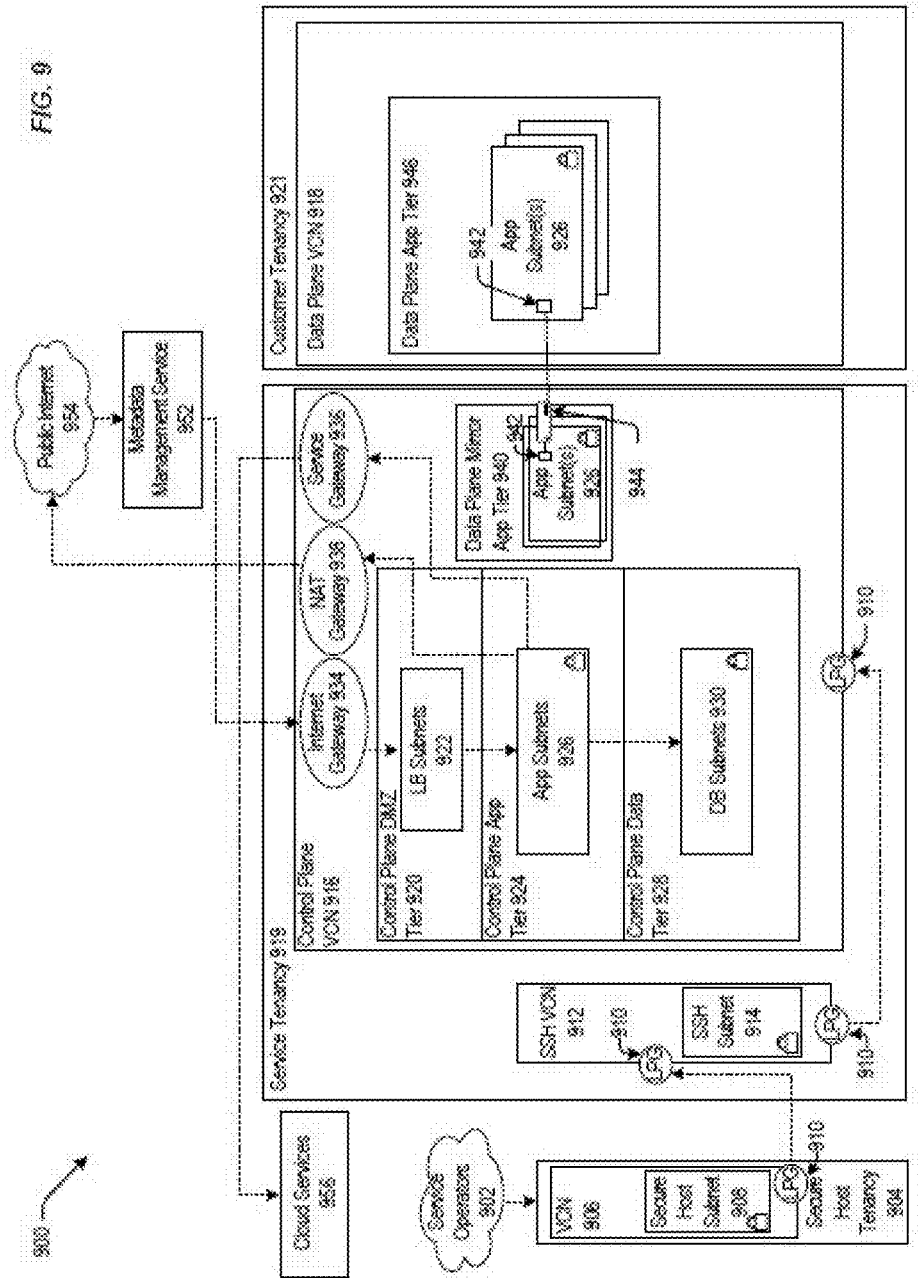
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively coupled to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow-resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
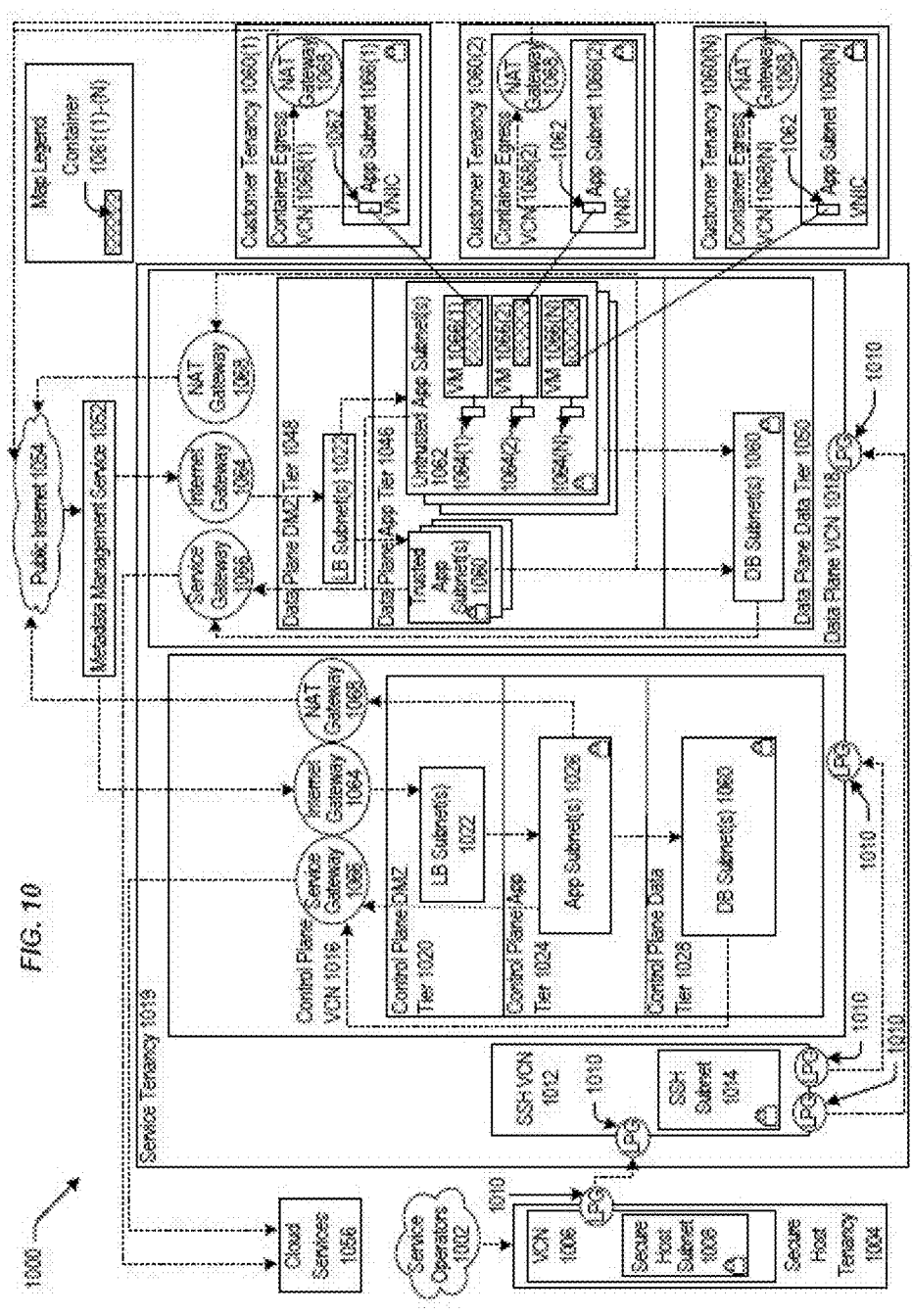
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management service 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
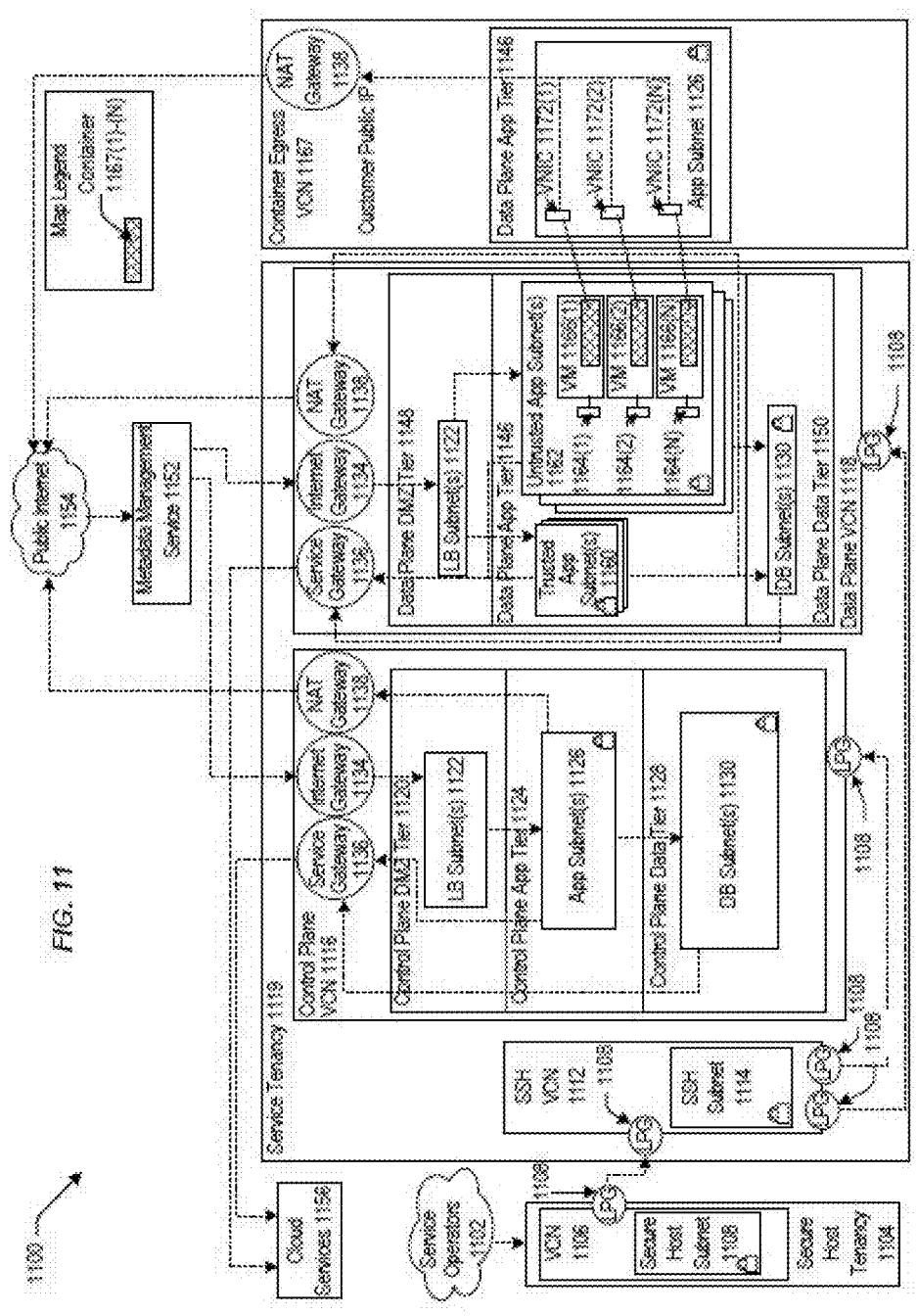
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant virtual machine 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management service 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the virtual machines 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Example Computer System

FIG. 12 illustrates an example computer system 1200, in which various embodiments may be implemented. The computer system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may include a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where the computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments, communications subsystem 1224 can include radio frequency (RF) transceiver components for accessing wireless voice and/or data networks (e.g., using cellular telephone technology, advanced data network technology, such as 3G, 4G, 5G, or EDGE (enhanced data rates for global evolution), WiFi (IEEE 802.11 family standards, or other mobile communication technologies, or any combination thereof)), global positioning system (GPS) receiver components, and/or other components. In some embodiments, communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "including," "having," "including," and "containing" are to be construed as open-ended terms (i.e., meaning "including, but not limited to,") unless otherwise noted. The term "connected" is to be construed as a partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

As used herein, when an action is "based on" something, this means the action is based at least in part on at least a part of the something. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage may be from 0 to 10 percent, as a non-limiting example.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method performed by one or more processors, the computer-implemented method comprising:

accessing text comprising a sequence of words, wherein:
    a plurality of spans is identified within the text,
    each span of the plurality of spans comprises one or more words from the sequence of words, and
    the plurality of spans comprises
        one or more pairs of target spans, each target span of the one or more pairs of target spans being associated with an entity type, each target pair of the one or more pairs of target spans comprising a subject span and an object span, and
        one or more mid-context spans, each mid-context span of the one or more mid-context spans appearing between a subject span and an object span that are included in a target pair;

generating, by a pre-trained machine learning (ML) model coupled to the one or more processors, embedding representations of tokens associated with one or more words appearing within the one or more pairs of target spans, tokens associated with the entity types of the target spans of the one or more pairs of target spans, and tokens associated with one or more mid-context words appearing within the one or more mid-context spans;

generating, by the pre-trained ML model for each target span, an entity-focused span embedding representation based on the embedding representations of the tokens associated with each target span and the embedding representations of one or more tokens associated with the entity type of that target span;

generating, by the pre-trained ML model for each mid-context span, a mid-context embedding representation based on the embedding representations of the tokens associated with each mid-context span;

generating, by the pre-trained ML model for each target pair, a probability distribution of each relation included in a set of relations based on an entity-focused span embedding representation of a subject span and an entity-focused span embedding representation of an object span that are included in each target pair and the mid-context embedding representation for a mid-context span appearing between the subject span and the object span of the target pair, the set of relations including a null relation; and predicting, by the pre-trained ML model, a given relation for a pair of target spans based on the probability distribution.

2. The computer-implemented method of claim 1, wherein:

the entity-focused span embedding representation is generated by integrating information specific to the entity type with the embedding representations of the tokens associated with each target span using entity independent span token embedding, span-aligned entity embedding, and span-independent entity representation.

3. The computer-implemented method of claim 2, further comprising:

applying, by a fully connected layer of the pre-trained ML model, activation functions on the entity-focused span embedding representation of the subject span, the entity-focused span embedding representation of the object span, and the mid-context embedding representation of the mid-context span appearing between the subject span and the object span for each target pair to obtain activated entity-focused span embedding representation of the subject span, activated entity-focused span embedding representation of the object span, and activated mid-context embedding representation for each target pair.

4. The computer-implemented method of claim 3, further comprising:

for each target pair, generating, by the fully connected layer, a concatenation of the activated entity-focused span embedding representation of the subject span, the activated entity-focused span embedding representation of the object span, and the activated mid-context embedding representation associated with each target pair.

5. The computer-implemented method of claim 4, wherein the probability distribution of each relation for each target pair is generated based on the concatenation.

6. The computer-implemented method of claim 5, wherein the generating of the probability distribution of each relation for each target pair takes into consideration the information specific to the entity type integrated into the activated entity-focused span embedding representation of the subject span and the activated entity-focused span embedding representation of the object span that are included in each target pair.

7. The computer-implemented method of claim 2, wherein the entity independent span token embedding maintains the embedding representations of the tokens associated with the one or more words within the target span, the span-aligned entity embedding includes a fixed-length representation of an entity type based on soft alignment with the tokens of the target span, and the span-independent entity representation includes a representation of an entity type that does not depend on the tokens of the target span.

8. A system comprising:

one or more processors; and one or more non-transitory computer-readable media storing instructions that, when executed by the one or more processors, cause the system to perform a method including:

accessing text comprising a sequence of words, wherein:
    a plurality of spans is identified within the text,
    each span of the plurality of spans comprises one or more words from the sequence of words, and
    the plurality of spans comprises
        one or more pairs of target spans, each target span of the one or more pairs of target spans being associated with an entity type, each target pair of the one or more pairs of target spans comprising a subject span and an object span, and
        one or more mid-context spans, each mid-context span of the one or more mid-context spans appearing between a subject span and an object span that are included in a target pair;

generating, by a pre-trained machine learning (ML) model, embedding representations of tokens associated with one or more words appearing within the one or more pairs of target spans, tokens associated with the entity types of the target spans of the one or more pairs of target spans, and tokens associated with one or more mid-context words appearing within the one or more mid-context spans;

generating, by the pre-trained ML model for each target span, an entity-focused span embedding representation based on the embedding representations of the tokens associated with each target span and the embedding representations of one or more tokens associated with the entity type of that target span;

generating, by the pre-trained ML model for each mid-context span, a mid-context embedding representation based on the embedding representations of the tokens associated with each mid-context span;

generating, by the pre-trained ML model for each target pair, a probability distribution of each relation included in a set of relations based on an entity-focused span embedding representation of a subject span and an entity-focused span embedding representation of an object span that are included in each target pair and the mid-context embedding representation for a mid-context span appearing between the subject span and the object span of the target pair, the set of relations including a null relation; and predicting, by the pre-trained ML model, a given relation for a pair of target spans based on the probability distribution.

9. The system of claim 8, wherein:

the entity-focused span embedding representation is generated by integrating information specific to the entity type with the embedding representations of the tokens associated with each target span using entity independent span token embedding, span-aligned entity embedding, and span-independent entity representation.

10. The system of claim 9, wherein the method further includes:

applying, by a fully connected layer of the pre-trained ML model, activation functions on the entity-focused span embedding representation of the subject span, the entity-focused span embedding representation of the object span, and the mid-context embedding representation of the mid-context span appearing between the subject span and the object span for each target pair to obtain activated entity-focused span embedding representation of the subject span, activated entity-focused span embedding representation of the object span, and activated mid-context embedding representation for each target pair.

11. The system of claim 10, wherein the method further includes:

for each target pair, generating, by the fully connected layer, a concatenation of the activated entity-focused span embedding representation of the subject span, the activated entity-focused span embedding representation of the object span, and the activated mid-context embedding representation associated with each target pair.

12. The system of claim 11, wherein the probability distribution of each relation for each target pair is generated based on the concatenation.

13. The system of claim 12, wherein the generating of the probability distribution of each relation for each target pair takes into consideration the information specific to the entity type integrated into the activated entity-focused span embedding representation of the subject span and the activated entity-focused span embedding representation of the object span that are included in each target pair.

14. The system of claim 9, wherein the entity independent span token embedding maintains the embedding representations of the tokens associated with the one or more words within the target span, the span-aligned entity embedding includes a fixed-length representation of an entity type based on soft alignment with the tokens of the target span, and the span-independent entity representation includes a representation of an entity type that does not depend on the tokens of the target span.

15. One or more non-transitory computer-readable media storing instructions that, when executed by one or more processors, cause the one or more processors to perform a method including:

accessing text comprising a sequence of words, wherein:

a plurality of spans is identified within the text, each span of the plurality of spans comprises one or more words from the sequence of words, and the plurality of spans comprises one or more pairs of target spans, each target span of the one or more pairs of target spans being associated with an entity type, each target pair of the one or more pairs of target spans comprising a subject span and an object span, and one or more mid-context spans, each mid-context span of the one or more mid-context spans appearing between a subject span and an object span that are included in a target pair;

generating, by a pre-trained machine learning (ML) model, embedding representations of tokens associated with one or more words appearing within the one or more pairs of target spans, tokens associated with the entity types of the target spans of the one or more pairs of target spans, and tokens associated with one or more mid-context words appearing within the one or more mid-context spans;

generating, by the pre-trained ML model for each target span, an entity-focused span embedding representation based on the embedding representations of the tokens associated with each target span and the embedding representations of one or more tokens associated with the entity type of that target span;

generating, by the pre-trained ML model for each mid-context span, a mid-context embedding representation based on the embedding representations of the tokens associated with each mid-context span;

generating, by the pre-trained ML model for each target pair, a probability distribution of each relation included in a set of relations based on an entity-focused span embedding representation of a subject span and an entity-focused span embedding representation of an object span that are included in each target pair and the mid-context embedding representation for a mid-context span appearing between the subject span and the object span of the target pair, the set of relations including a null relation; and predicting, by the pre-trained ML model, a given relation for a pair of target spans based on the probability distribution.

16. The one or more non-transitory computer-readable media of claim 15, wherein the entity-focused span embedding representation is generated by integrating information specific to the entity type with the embedding representations of the tokens associated with each target span using entity independent span token embedding, span-aligned entity embedding, and span-independent entity representation, and wherein the entity independent span token embedding maintains the embedding representations of the tokens associated with the one or more words within the target span, the span-aligned entity embedding includes a fixed-length representation of an entity type based on soft alignment with the tokens of the target span, and the span-independent entity representation includes a representation of an entity type that does not depend on the tokens of the target span.

17. The one or more non-transitory computer-readable media of claim 16, wherein the method further includes:

applying, by a fully connected layer of the pre-trained ML model, activation functions on the entity-focused span embedding representation of the subject span, the entity-focused span embedding representation of the object span, and the mid-context embedding representation of the mid-context span appearing between the subject span and the object span for each target pair to obtain activated entity-focused span embedding representation of the subject span, activated entity-focused span embedding representation of the object span, and activated mid-context embedding representation for each target pair.

18. The one or more non-transitory computer-readable media of claim 17, wherein the method further includes:

for each target pair, generating, by the fully connected layer, a concatenation of the activated entity-focused span embedding representation of the subject span, the activated entity-focused span embedding representation of the object span, and the activated mid-context embedding representation associated with each target pair.

19. The one or more non-transitory computer-readable media of claim 18, wherein the probability distribution of each relation for each target pair is generated based on the concatenation.

20. The one or more non-transitory computer-readable media of claim 19, wherein the generating of the probability distribution of each relation for each target pair takes into consideration the information specific to the entity type integrated into the activated entity-focused span embedding representation of the subject span and the activated entity-focused span embedding representation of the object span that are included in each target pair.

* * * * *